(12) United States Patent
Nagai et al.

(10) Patent No.: US 11,745,172 B2
(45) Date of Patent: Sep. 5, 2023

(54) EXHAUST GAS PURIFICATION CATALYST

(71) Applicant: Mitsui Mining & Smelting Co., Ltd., Tokyo (JP)

(72) Inventors: Yusuke Nagai, Saitama (JP); Shingo Akita, Saitama (JP); Hiroki Kurihara, Saitama (JP); Yoshinori Endo, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 17/295,718

(22) PCT Filed: Mar. 9, 2020

(86) PCT No.: PCT/JP2020/010114
§ 371 (c)(1),
(2) Date: May 20, 2021

(87) PCT Pub. No.: WO2021/181487
PCT Pub. Date: Sep. 16, 2019

(65) Prior Publication Data
US 2022/0401939 A1    Dec. 22, 2022

(51) Int. Cl.
*B01J 21/04*        (2006.01)
*B01J 21/06*        (2006.01)
(Continued)

(52) U.S. Cl.
CPC .............. *B01J 35/04* (2013.01); *B01J 21/04* (2013.01); *B01J 21/066* (2013.01); *B01J 23/10* (2013.01)

(58) Field of Classification Search
CPC . B01J 21/04; B01J 21/066; B01J 23/10; B01J 35/04; B01D 53/94; F01N 3/2803
(Continued)

(56) References Cited

U.S. PATENT DOCUMENTS 8,133,841 B2 *  3/2012  Noda ............... B01D 46/24492
                                                        422/177
8,580,705 B2 * 11/2013  Aoki ................... B01J 37/0248
                                                        502/304
(Continued)

FOREIGN PATENT DOCUMENTS

CN          203303960 U     11/2013
CN          109089414 A     12/2018
(Continued)

OTHER PUBLICATIONS

International Search Report (ISR) dated May 19, 2020 filed in PCT/JP2020/010114.
(Continued)

*Primary Examiner* — Cam N. Nguyen
(74) *Attorney, Agent, or Firm* — Rankin, Hill & Clark LLP

(57) ABSTRACT

A substrate (11) of an exhaust gas purification catalyst (10) includes inflow-side cells (21), outflow-side cells (22), and porous partition walls (23), each separating the inflow-side cell and the outflow-side cell. Catalyst portions (14, 15) are provided on the surfaces of the partition walls that each face the inflow-side cell and/or the surfaces of the partition walls that each face the outflow-side cell. In a cross section vertical to an exhaust gas flow direction, the percentage of the total area of voids, each void satisfying the expression $L/\{2(\pi S)^{1/2}\} \le 1.1$ (wherein L is the perimeter of the void in the cross section, and S is the area of the void in the cross section), is greater than 10% to 30% or less based on the apparent area of the catalyst portion present on the partition wall. The content of zirconium element in terms of oxide (amount of $ZrO_2$) in the catalyst portions is from 35 mass % to 85 mass %.

9 Claims, 6 Drawing Sheets

(51) Int. Cl.
  *B01J 23/10* (2006.01)
  *B01J 35/04* (2006.01)
  *B01D 53/94* (2006.01)
  *F01N 3/28* (2006.01)

(58) Field of Classification Search
  USPC ......... 502/304, 349, 355, 415, 439; 422/180
  See application file for complete search history.

(56) References Cited

U.S. PATENT DOCUMENTS

| | | | | |
|---|---|---|---|---|
| 9,175,587 | B2* | 11/2015 | Goto | B01D 46/24491 |
| 9,700,842 | B2* | 7/2017 | Miyairi | B01J 35/04 |
| 10,233,803 | B2* | 3/2019 | Sumiya | B01D 53/9454 |
| 10,286,392 | B2* | 5/2019 | Kobayashi | B01D 53/9418 |
| 10,792,615 | B2* | 10/2020 | Li | B01J 23/44 |
| 10,850,269 | B2* | 12/2020 | Tanaka | B01D 46/24492 |
| 2007/0231539 | A1* | 10/2007 | Miyairi | B01J 23/63 |
| | | | | 428/116 |
| 2008/0125316 | A1* | 5/2008 | Noda | B01J 23/63 |
| | | | | 502/439 |
| 2011/0005211 | A1 | 1/2011 | Tissler et al. | |
| 2019/0099749 | A1 | 4/2019 | Kobayashi et al. | |
| 2019/0120104 | A1 | 4/2019 | Inoda et al. | |
| 2019/0299139 | A1 | 10/2019 | Tanaka | |

FOREIGN PATENT DOCUMENTS

| | | |
|---|---|---|
| CN | 109569706 A | 4/2019 |
| JP | 2009-663 A | 1/2009 |
| JP | 2010-1184 A | 1/2010 |
| JP | 2012-173588 A | 9/2012 |
| JP | 2017-82745 A | 5/2017 |

OTHER PUBLICATIONS

Decision to Grant a Patent dated Jul. 28, 2020 for Japanese Patent Application No. 2020-536905.

* cited by examiner

EXHAUST GAS PURIFICATION CATALYST

TECHNICAL FIELD

The present invention relates to exhaust gas purification catalysts.

BACKGROUND ART

Fuel economy standards for internal combustion engines, such as gasoline engines, are becoming stricter by the year, and gasoline direct injection engines (hereinbelow also called "GDI engines") are now widely used in order to comply with such standards. It is known that GDI engines have good fuel efficiency and provide high output, and on the other hand, it is also known that they emit more than 5 to 10 times the amount of particulate matter (hereinbelow also called "PM", including soot) in exhaust gas compared to conventional port injection engines. In view of complying with environmental regulations regarding PM emission, there are demands that gasoline engine vehicles, such as GDI engine vehicles, should be equipped with gasoline particulate filters (hereinbelow also called "GPFs") having the capability to collect PM, as in diesel engine vehicles.

Typically, there is limited space for installing exhaust gas purification catalysts. Thus, a filter catalyst has come into use in recent years that includes a filter described above and noble-metal three-way catalysts, such as Pd, Pt and Rh, supported on the filter to collect PM and also remove pollutants such as nitrogen oxides ($NO_x$), carbon monoxide (CO) and hydrocarbons (HC).

For example, Patent Literature 1 discloses an exhaust gas purification filter arranged in an exhaust path of an internal combustion engine and collecting particulate matter in exhaust gas exhausted from the internal combustion engine, the exhaust gas purification filter including a substrate and a catalyst layer provided on the substrate.

The catalyst layer contains a carrier and a metal catalyst; and, when the area of the catalyst layer is defined as 100% in an electron microscope observation image of a cross section of the catalyst layer, large pores having a circle equivalent diameter of greater than 5 μm occupy 45% or more of the area.

CITATION LIST

Patent Literature

Patent Literature 1: US 2019/299139A1

SUMMARY OF INVENTION

Technical Problem

Conventionally, GPFs are divided into two types: in-wall types, in which substantially the entire catalyst layer is formed within the partition wall, and on-wall types, in which at least a portion of the catalyst layer is formed on the partition wall. On-wall types have better PM collection performance than in-wall types; however, because of the high porosity of the partition wall in a GPF filter substrate, the adhesiveness of the on-wall catalyst layer to the partition wall is weaker compared to in-wall types, in which a catalyst layer is formed within the partition wall of the filter substrate. This results in a tendency for on-wall catalyst layers to peel. Furthermore, GPFs still have issues in achieving both PM collection and suppression of pressure-loss, regardless of whether the GPFs are of the in-wall or on-wall type.

The aforementioned conventional art attempts to overcome the issue of achieving both PM collection and suppression of pressure-loss by forming, on a partition wall, a catalyst layer having many relatively large pores in percentage terms. In the literature, however, features for suppressing peeling of the catalyst layer is not taken into consideration.

The present invention aims at solving the aforementioned and other problems of the conventional art, and providing an exhaust gas purification catalyst capable of delivering high PM collection performance while suppressing peeling of the catalyst layer and an increase in back pressure.

Solution to Problem

As a result of diligently studying features for suppressing peeling of the catalyst layer while delivering PM collection performance and suppressing pressure loss, the inventors have found that the aforementioned issues can be overcome by adjusting the percentage of near-perfect circular pores within a specific range in a cross section of the catalyst layer, and also using zirconium in the catalyst layer in a specific amount.

The present invention has made based on the aforementioned finding, and provides an exhaust gas purification catalyst including: a substrate, and catalyst portions provided in the substrate. The catalyst portions include a plurality of voids. The substrate includes: inflow-side cells, each inflow-side cell being a space having an open end on an inflow side thereof and a closed end on an outflow side thereof in an exhaust gas flow direction; outflow-side cells, each outflow-side cell being a space having a closed end on an inflow side thereof and an open end on an outflow side thereof in the exhaust gas flow direction; and porous partition walls, each separating the inflow-side cell and the outflow-side cell. The catalyst portions are provided on surfaces of the partition walls that each face the inflow-side cell and/or surfaces of the partition walls that each face the outflow-side cell. In a cross section vertical to the exhaust gas flow direction, the percentage of the total area of the voids, each void satisfying the expression $L/\{2(\pi S)^{1/2}\} \leq 1.1$, wherein L is the perimeter of the void in the cross section and S is the area of the void in the cross section, is greater than 10% to 30% or based on an apparent area of the catalyst portion present on the partition wall. The content of zirconium element in terms of oxide (amount of $ZrO_2$) in the catalyst portions is from 35 mass % to 85 mass %.

Advantageous Effects of Invention

The present invention can provide an exhaust gas purification catalyst having a wall-flow structure and delivering excellent PM collection performance while suppressing pressure loss and peeling of the catalyst layer. The present invention can also provide a method for manufacturing the exhaust gas purification catalyst in an industrially advantageous manner.

DESCRIPTION OF EMBODIMENTS

The present invention is described below by way of preferred embodiments thereof. The present invention is, however, not limited to the following embodiments.

An example of the exhaust gas purification catalyst 10 according to the present embodiment is illustrated in FIGS. 1, 2, 7 and 8.

The exhaust gas purification catalyst 10 is provided in an exhaust path of an internal combustion engine such as a gasoline engine, and particularly a GDI engine of a vehicle. The exhaust gas purification catalyst 10 is used, for example, as a GPF.

Figure 1:
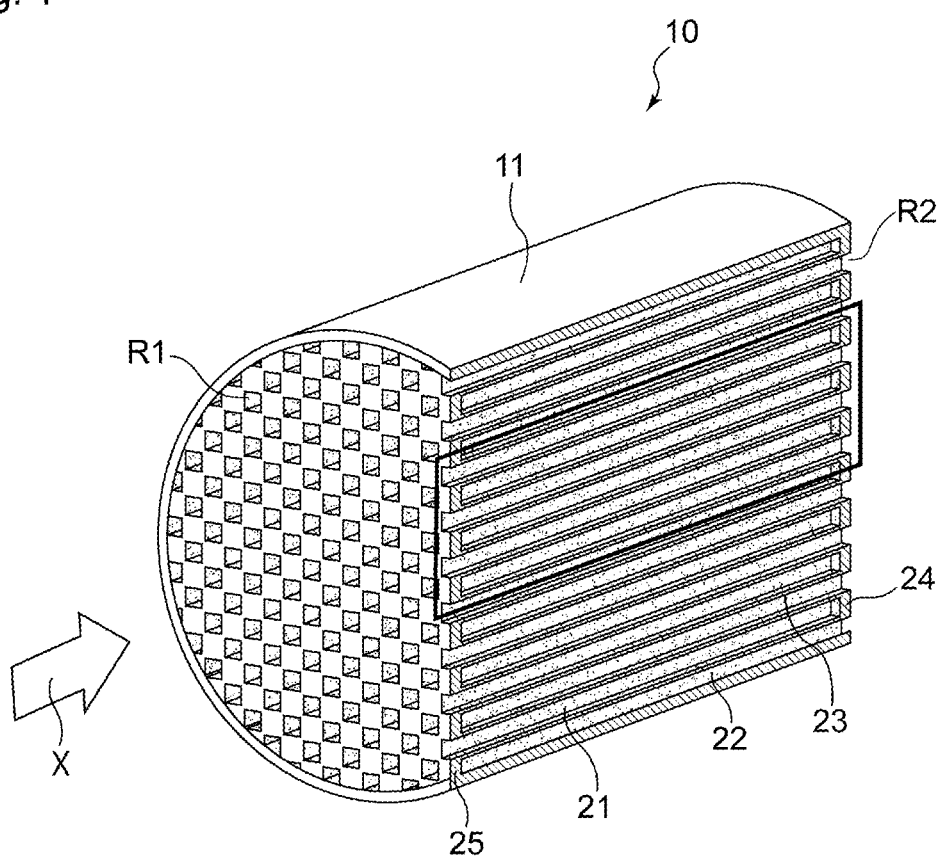
FIG. 1 is a schematic cross-sectional perspective view of an exhaust gas purification catalyst of one embodiment of the present invention.

As illustrated in FIG. 1, the exhaust gas purification catalyst 10 includes a substrate 11 having a so-called wall-flow structure. A substrate made of any types of materials can be used as the substrate 11. For example, a substrate made of ceramics, such as cordierite or silicon carbide (SiC), can be favorably used. Typically, the substrate has a columnar shape as illustrated in FIG. 1, and is arranged in the exhaust path of an internal combustion engine such that the axial direction of the columnar shape substantially matches the exhaust gas flow direction X. FIG. 1 illustrates a substrate having a circular cylindrical outer shape. The outer shape of the substrate as a whole, however, may be an elliptic cylindrical or polygonal columnar shape, instead of a circular cylindrical shape.

As illustrated in FIG. 1, the substrate 11 includes inflow-side cells 21 and outflow-side cells 22. Each inflow-side cell 21 is a space, the space extending in the exhaust gas flow direction X and having an open end on the inflow side thereof and a closed end on the outflow side thereof in the direction X. Each outflow-side cell 22 is a space, the space extending in the flow direction X and having a closed end on the inflow side thereof and an open end on the outflow side thereof in the direction X.

The inflow-side cell 21 is closed by a sealing portion 24 at the end on the exhaust gas outflow-side in a downstream end portion R2 in the exhaust gas flow direction X, but is open at the end on the exhaust gas inflow-side in an upstream end portion R1. The outflow-side cell 22 is closed by a sealing portion 25 at the end on the exhaust gas inflow-side in the upstream end portion R1, but is open at the end on the exhaust gas outflow-side in the downstream end portion R2. The inflow-side cell 21 and the outflow-side cell 22 are configured such that a gas, a liquid, and the like can flow through an opening end (hereinafter also referred to as "opening"), but the flow of exhaust gas is blocked at the sealing portion 24 and the sealing portion 25, which are closed portion. The inflow-side cell 21 and the outflow-side cell 22 are each a bottomed cylindrical space extending in the axis direction of the substrate 11. The cross-sectional shape of each of the inflow-side cell 21 and the outflow-side cell 22 in a cross section vertical to the axis direction of the substrate 11 may be any geometric shape, and examples thereof include a quadrilateral such as a square, a parallelogram, a rectangle, and a trapezoid, a polygon such as a triangle, a hexagon, and an octagon, a circular shape, and an elliptic shape.

A porous partition wall 23 is formed between the inflow-side cell 21 and an adjacent outflow-side cell 22, the partition wall separating the two cells. The partition wall 23 serves as a side wall of the inflow-side cell 21 and the outflow-side cell 22 having a bottomed cylindrical shape. The partition wall 23 has a porous structure to allow a gas such as exhaust gas to pass therethrough. The thickness of the partition wall 23 is preferably 150 μm to 400 μm, for example. As used herein, the term "thickness" refers to the thickness of a thinnest portion if the partition wall 23 between the inflow-side cell 21 and the outflow-side cell 22 does not have a uniform thickness.

In the substrate 11, the area of the opening of a single inflow-side cell 21 in the inflow-side end portion R1 may be the same or different from the area of the opening of a single outflow-side cell 22 in the outflow-side end portion R2. Herein, the area of an opening refers to the area on a plane vertical to the exhaust gas flow direction.

Figure 2:
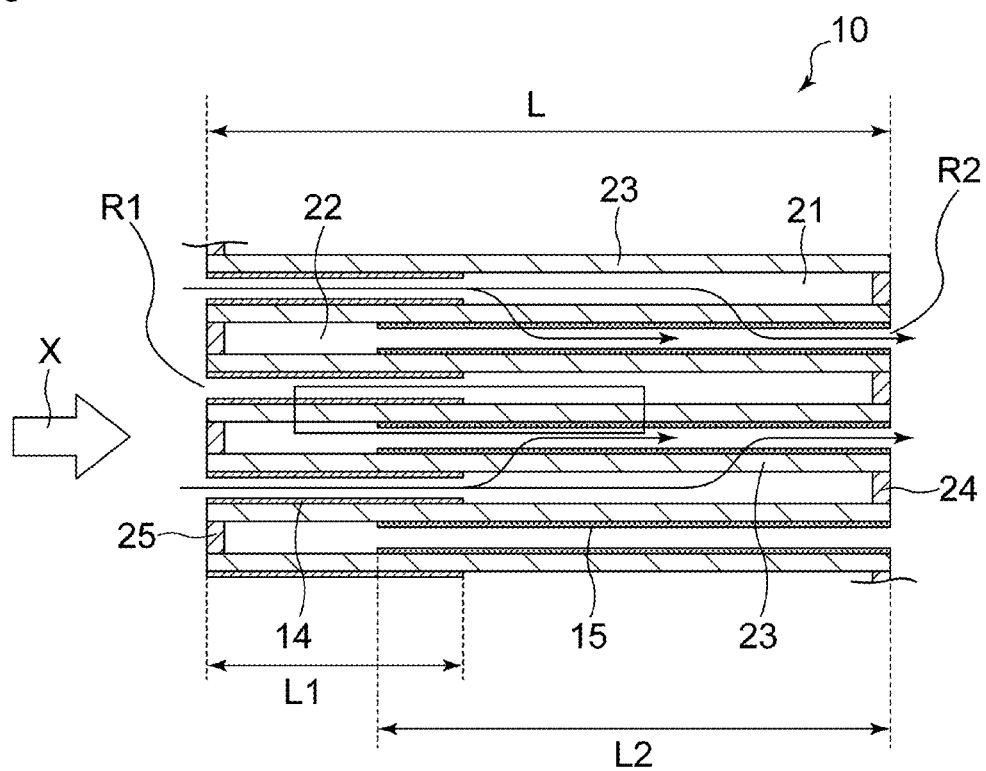
FIG. 2 is a cross-sectional view of the portion surrounded by the rectangle in FIG. 1, when viewed along the axial direction of the substrate.

The substrate 11 supports catalyst portions including a catalytically active component. In view of PM collection performance and exhaust gas purification performance, the catalyst portions preferably include first catalyst portions 14 in the form of a layer (hereinafter also called "first catalyst layer(s) 14"), the first catalyst portions 14 each being provided at least on the upstream side in the exhaust gas flow direction X on the surface of the partition wall 23 that faces the inflow-side cell 21, and second catalyst portions 15 in the form of a layer (hereinafter also called "second catalyst layer(s) 15"), the second catalyst portions 15 each being provided at least on the downstream side in the exhaust gas flow direction X on the surface of the partition wall 23 that faces the outflow-side cell 22, as shown in FIG. 2. In view of PM collection performance and exhaust gas purification performance, the first catalyst layer 14 is preferably formed in at least a portion in the area extending from the upstream end by a length of 20 mm downstream therefrom in the exhaust gas flow direction. In view of PM collection performance and exhaust gas purification performance, the second catalyst layer 15 is preferably formed in at least a portion in the area extending from the downstream end by a length of 20 mm upstream therefrom in the exhaust gas flow direction. Hereinbelow, the "catalyst portion" is also referred to as "catalyst layer", and the "catalyst layer" may refer to either the first catalyst layer 14 or the second catalyst layer 15. Typically, the length of the exhaust gas purification catalyst in the exhaust gas flow direction X is from 50 to 200 mm.

The inventors have found that peeling of the catalyst layer can be suppressed effectively when the catalyst layer on the partition wall includes at least a certain quantity of circular voids in a cross section vertical to the exhaust gas flow direction of the catalyst 10. The reason for this is considered as follows.

Voids in the catalyst layer are typically formed by adding a void forming reagent to a catalyst layer-forming slurry, and calcinating the slurry to eliminate the void forming reagent. The slurry often includes a void forming reagent having a greater diameter than the diameter of pores in the partition wall. Thus, many particles of the void forming reagent are present in a state of abutting the partition wall's surface, without entering the pores in the partition wall. In a cross-sectional view of the catalyst 10, circular voids have a smaller point of contact with the partition wall (substrate) compared to voids having other shapes, such as acicular or rectangular voids. Further, spherical particles of a void forming reagent, which form circular voids in the cross section of the catalyst 10, have a small surface area per unit volume, and are thus less likely to aggregate in the slurry compared to an acicular void forming reagent. This inhibits the formation of huge voids in the catalyst layer. For the reasons above, the presence of a certain quantity of circular voids in the cross section of the catalyst 10 contributes to suppression of peeling of the catalyst layer. Thus, a catalyst layer including a certain quantity of circular voids in the cross section of the catalyst 10 can be effectively prevented from peeling between the catalyst layer and the partition wall (substrate) while suppressing pressure loss. Stated differently, the catalyst 10 of the present embodiment can exhibit the conventional voids' effect of suppressing pressure loss by including voids in the cross section of the catalyst 10, and also, the catalyst 10 can further exhibit, by forming the voids in a circular shape, the effect of effectively suppressing peeling between the catalyst layer and the partition wall (substrate), which would otherwise be caused by the voids. The effects of the present invention are effective in uses for GPFs, which particularly require the suppression of pressure loss by forming voids in the catalyst layer while maintaining high collection performance.

More specifically, in a cross section of the exhaust gas purification catalyst 10 vertical to the exhaust gas flow direction (hereinbelow also called "direction X" or "exhaust gas flow direction X"), the percentage of the total area of the voids, each void satisfying the expression $L/\{2(\pi S)^{1/2}\} \leq 1.1$ (wherein L is the perimeter of the void in the cross section, and S is the area of the void in the cross section) (the percentage is hereinafter also referred to as "circular void percentage"), is preferably greater than 10% to 30% or less based on the apparent area of the catalyst layer present on the partition wall 23.

The apparent area of the catalyst layer present on the partition wall 23 in the aforementioned cross section refers to the entire area of the catalyst layer, including the voids, present on the partition wall 23 in the aforementioned cross section.

The closer the value of the expression $L/\{2(\pi S)^{1/2}\}$ is to 1, the closer the shape is to a perfect circle. The minimum of the value from the expression is 1. Thus, the shape of a void whose value derived by the expression is 1.1 or less is close to a perfect circle. Hereinbelow, a void satisfying the aforementioned expression is called an "approximately-perfect circular void". Considering that the circular void percentage is determined by image processing, the approximately-perfect circular voids preferably have a circle equivalent diameter of 1 μm or greater. Thus, more specifically, the circular void percentage is preferably the percentage of the total area of voids each satisfying the aforementioned expression and having a circle equivalent diameter of from 1 to 60 μm. Herein, "circle equivalent diameter" refers to the diameter of a circle having the same area as the void.

The circular void percentage higher than 10% further reduces pressure loss. The circular void percentage to 30% or less suppresses peeling of the catalyst layer from the partition wall and also suppresses deterioration in PM collection performance. From these viewpoints, the circular void percentage of the catalyst layer on the partition wall is more preferably from 11 to 20%, even more preferably from 12 to 15%. In the present embodiment, even though the circular void percentage is as high as above 10%, peeling of the catalyst layer from the partition wall is prevented by controlling the content of zirconium element in terms of oxide (amount of $ZrO_2$) in the catalyst layer to the range described later. The reason why an increase in the content of $ZrO_2$ in the catalyst layer favorably suppresses peeling of the catalyst portion is probably because of characteristics of $ZrO_2$, including the high melting point; large bond-dissociation energy with oxygen; high flexural strength and fracture toughness, which lead to durability to mechanical action; and small change in specific surface area before and after calcinating.

The circular void percentage is preferably determined through observation with a scanning electron microscope. The position, in the direction X, of the cross section of the exhaust gas purification catalyst 10 to be observed with a scanning electron microscope is not particularly limited, and a cross section at any discretionary position can be observed. An example of a method for determining the circular void percentage is described below.

Figure 3A:
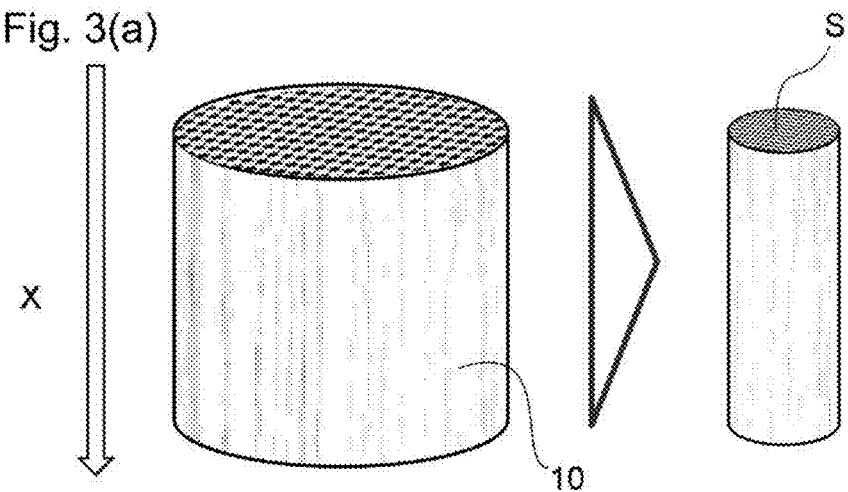
FIG. 3 is a diagram illustrating an exemplary method for extracting a sample for use in observing cross sections of catalyst layers.
Figure 3B:
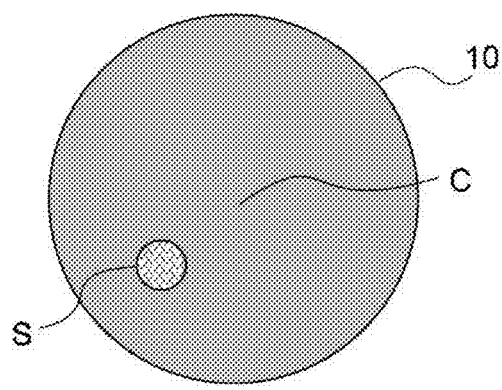

(1) Sampling:

As illustrated in FIG. 3(*a*), a circular-cylindrical sample S having a diameter of 25.4 mm and a central axis parallel to the exhaust gas flow direction is cut out from the exhaust gas purification catalyst 10. The length of the circular-cylindrical sample S spans the entirety of the exhaust gas purification catalyst 10 in the exhaust gas flow direction X. In a plane (see FIG. 3(*b*)) vertical to the exhaust gas flow direction, the position at which the circular-cylindrical sample S is cut out from the exhaust gas purification catalyst 10 is not particularly limited. In the aforementioned plane, the central axis of the cut-out portion is preferably located at a position radially outward from the substrate's center C and separated therefrom by a length of 10 to 70% based on the radial length, as illustrated in FIG. 3(*b*), in view of allowing a plurality of circular-cylindrical samples S to be cut out from a single catalyst. The "substrate's center" in the aforementioned plane is a point that divides, into two equal parts, the longest line segment traversing the outer contour of the substrate in the plane. The "radial length" is half the aforementioned longest line segment.

Figure 3C:
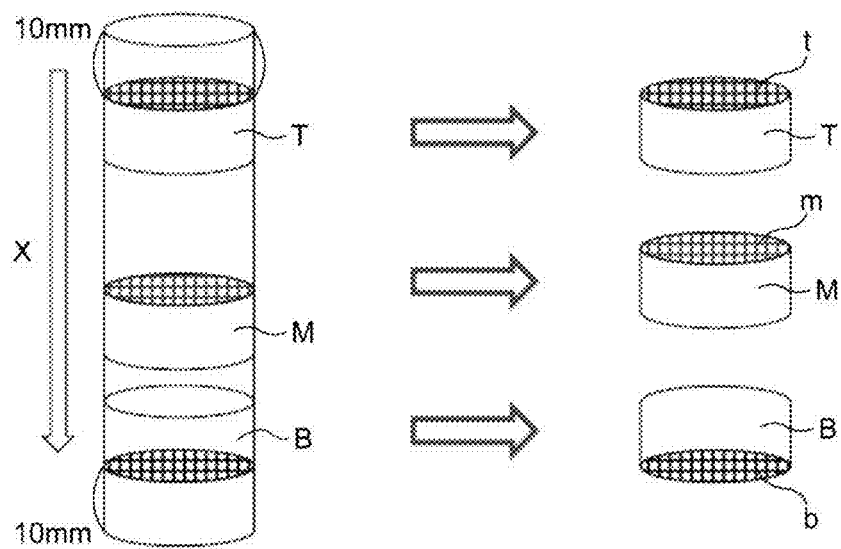

As described above, the position of the cross section of the exhaust gas purification catalyst 10 in the exhaust gas flow direction X is not particularly limited. For example, the cross section of the first catalyst layer or the second catalyst layer can be easily observed if the cross-sectional position is at a position on the upstream side that is within 10 mm from the upstream end, in the direction X, of the circular-cylindrical sample S and that does not overlap the sealing portion 25, or at a position on the downstream side that is within 10 mm from the downstream end, in the direction X, of the sample and that does not overlap the sealing portion 24. However, the observation surface may be in a central portion, in the direction X, of the sample S. The observation surface is exposed by cutting the sample at a cross section vertical to the direction X. The observation surface is embedded with a resin and polished. In view of handling of the sample, the thickness (i.e., length in the direction X) of the observation sample is preferably 10 mm. FIG. 3(*c*) illustrates the case of obtaining: two samples for observing at positions t and b located 10 mm away from the upstream and downstream ends, respectively, in the exhaust gas flow direction X (samples T and B in FIG. 3(c)); and a sample for observing at the center position m in the exhaust gas flow direction X (sample M in FIG. 3(c)).

Figure 4:
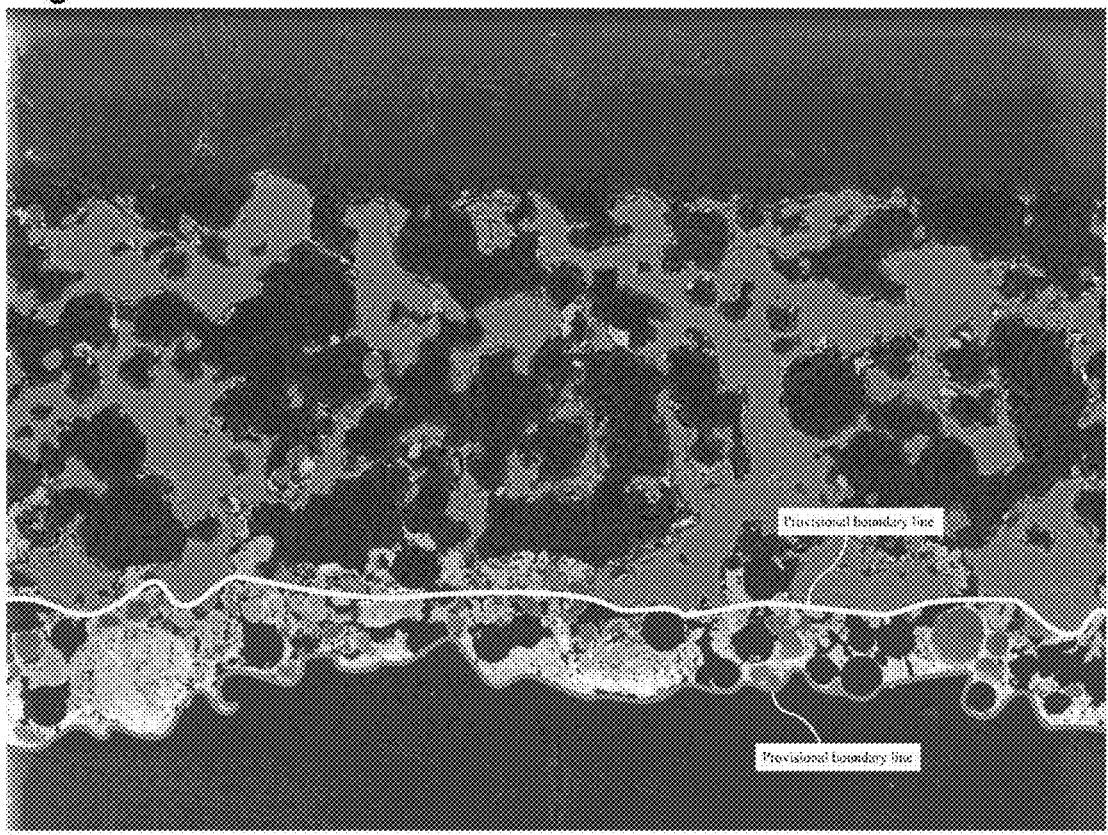
FIG. 4 is an example of an image of a catalyst portion on a partition wall as observed under a scanning electron microscope with provisional boundary lines drawn on the image.

(2) Determination of Partition Wall's Outer Edge in Contact with Catalyst Layer:

The distribution of partition wall components and catalyst layer components on the aforementioned observation surface is observed and determined by electron probe microanalyzer (EPMA) mapping. The observation magnification is from 40× to 1000× (acceleration voltage: 15 to 25 kV). The substrate components and catalyst layer components to be used for determining the area of the catalyst layer on the partition wall can be analyzed by subjecting the substrate and the catalyst layer of the exhaust gas purification catalyst 10 to X-ray fluorescence analysis etc. For example, in cases where the substrate includes cordierite, the distribution of Si or Mg as a substrate component is observed. Examples of catalyst layer components include Al, Ce, Zr, Pt, Pd, and Rh. The same sample is subjected to image capturing at the same position with a scanning electron microscope (SEM) under the same magnification as for EPMA mapping, and the image is matched with the aforementioned EPMA mapping image, to determine, on the SEM image, the area in which the catalyst layer components are distributed and the area in which the partition wall components are distributed. Then, as illustrated in FIG. 4, for example, the outer edge of the area in which the partition wall components are distributed is defined as a "provisional boundary line" of the catalyst layer on the partition wall. The acceleration voltage of SEM observation is preferably from 10 to 15 kV.

In the SEM observation image and the EPMA observation image, the longitudinal direction of the observation image (or, in cases where the observation image is square, the direction of one side) is preferably substantially vertical to the thickness direction of the catalyst layer. An image in which the catalyst layer's outer edge (i.e., the outer edge on the other side than the partition wall side) extends along the longitudinal direction of the observation image (or the direction of one side in cases where the observation image is square) over the entirety of the observation image in the longitudinal direction is selected as the SEM observation image and the EPMA observation image of the catalyst layer. In other words, for example, there may be a case where the catalyst layer exists only in a part of the observation image in the longitudinal direction because the catalyst layer's outer edge is bent in the middle of the longitudinal direction of the observation image, and such an image is not selected. This is because such bent sections have poor exhaust gas permeability and little contribution to pressure loss.

Figure 5:
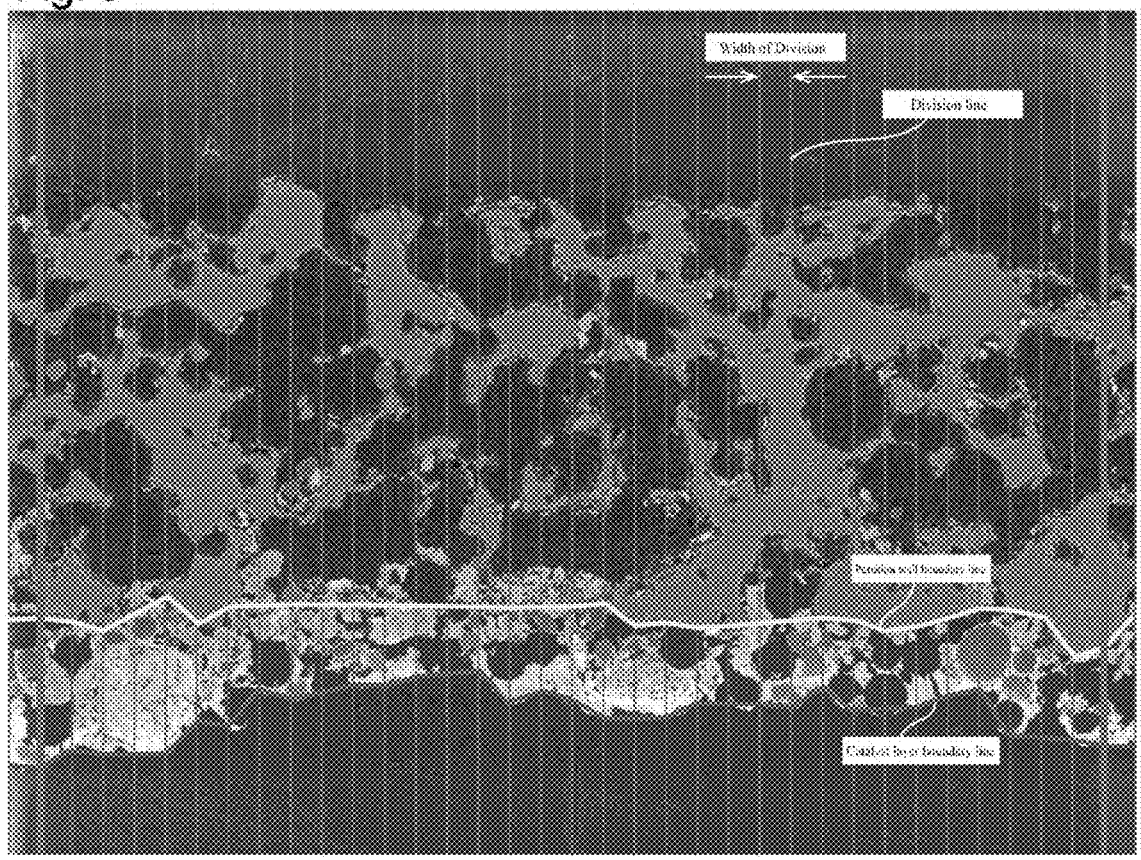
FIG. 5 is an example of an image of the catalyst portion on the partition wall as observed under a scanning electron microscope with division lines drawn on the image.

(3) Determination of Width of Division:

The aforementioned outer edge of the area in which the partition wall components are distributed in the EPMA mapping is defined on the SEM image as the outer edge, on the partition wall side, of the catalyst layer on the partition wall. On the other hand, the catalyst layer's outer edge on the other side than the partition wall side is defined on the basis of a difference in color between the catalyst layer/substrate and the other sections. These outer edges are defined as "provisional boundary lines", as illustrated in FIG. 4, for example. An exemplary color difference is illustrated in FIGS. 4 and 5, and in FIGS. 4 and 5, the catalyst layer and substrate are white or gray, whereas the other sections are black. The "provisional boundary lines" can be defined by image processing software for drawing boundary lines, which will be described later, and the selective threshold can be set within the same range as described later. The "provisional boundary lines" are for defining the later-described width of the division and for provisionally defining approximately-perfect circular voids, but are not to be used for measuring the area of the catalyst layer.

In the catalyst layer on the partition wall as defined by the provisional boundary lines, the void area (S) and void perimeter (L) for each void are measured, and it is determined for each void whether or not the circle equivalent diameter is from 1 to 60 μm and whether or not the void satisfies the expression $L/\{2(\pi S)^{1/2}\} \leq 1.1$. Image processing for determining the shape of each void can be performed with image processing software for drawing boundary lines. Examples of such image processing software for drawing boundary lines include PictBear (from Fenrir Inc.). The selective threshold is preferably from 20 to 40 with reference to, for example, the color of a clear void section. The "color of a clear void section" is the color of a section other than the constituent components of the catalyst layer or the substrate, and is typically black, as illustrated in FIGS. 4 and 5. Preferably, the outer periphery of each void is drawn by a line with a thickness of at least 20 points. After drawing the boundary line, the perimeter L and area S of each void are calculated. Image analysis software can be used for the calculation, including ImageJ (public domain), Photoshop (from Adobe Systems Incorporated), and AreaQ (from S-Tech Corporation). In a total of 20 fields-of-view, the area is measured for each void whose entirety is included within the catalyst layer on the partition wall as defined by the aforementioned "provisional boundary lines", whose circle equivalent diameter is from 1 to 60 μm, and that satisfies the expression $L/\{2(\pi S)^{1/2}\} \leq 1.1$. For all such voids, the respective circle equivalent diameters are measured. Then, as illustrated in FIG. 5, for example, a plurality of straight lines (hereinbelow also called "division lines") that are parallel to the catalyst layer's thickness direction are drawn on the SEM image of the catalyst's cross section at intervals of a width that is equivalent to the median diameter of the obtained circle equivalent diameters (hereinafter also called "width of the division"). Each of the 20 fields-of-view is a field-of-view including at least one void whose entirety is included within the catalyst layer on the partition wall as defined by the aforementioned "provisional boundary lines", whose circle equivalent diameter is from 1 to 60 μm, and that satisfies the expression $L/\{2(\pi S)^{1/2}\} \leq 1.1$; fields-of-view that do not include such a void are excluded from the 20 fields-of-view. There may be a case where an observation image shows catalyst layers respectively formed on both surfaces of a partition wall, both such catalyst layers including at least one void that has a circle equivalent diameter of from 1 to 60 μm and satisfies the expression $L/\{2(\pi S)^{1/2}\} \leq 1.1$. In such a case, the measurement result is obtained for the catalyst layer whose area (i.e., area surrounded by the provisional boundary lines and the edges of the observation image) is larger among the two catalyst layers, and the other catalyst layer is excluded from measurement.

(4) Determination of Apparent Area of Catalyst Layer on Partition Wall:

Measurement in the SEM observation image is performed in a field-of-view in which there are from 30 to 40 division lines drawn at intervals of the aforementioned width of the division. In cases where this condition is not satisfied, the magnification is changed before performing the following process. As illustrated in FIG. 5, a line is drawn by connecting, with straight line segments, intersection points between the respective division lines and the partition wall's outer edge determined by the aforementioned EPMA mapping, and this line is taken as the line defining the boundary between the partition wall and the catalyst layer (this line is called a "partition wall boundary line" and distinguished from the aforementioned "provisional boundary line"). Further, on the other side than the partition wall side, a line is drawn by connecting, with straight line segments, intersection points between the respective division lines and the edge of the catalyst layer as determined by the aforementioned color difference, and this line is taken as the line defining the boundary between the catalyst layer and the exterior (this line is called a "catalyst layer boundary line" and distinguished from the aforementioned "provisional boundary line").

The apparent area of the catalyst layer is determined as the area surrounded by the partition wall boundary line, the catalyst layer boundary line, and the two outermost division lines when viewed in the longitudinal direction (the thick division lines in FIG. 5) in the observation image, as illustrated in FIG. 5, for example.

(5) Determination of Area of Approximately-Perfect Circular Void:

Next, the region surrounded by the partition wall boundary line, the catalyst layer boundary line, and the two outermost division lines when viewed in the longitudinal direction (hereinafter also called 'region with apparent area') is re-determined as the region of the catalyst layer on the partition wall. Along with re-determining the region of the catalyst layer on the partition wall, voids and respective areas thereof are also re-determined that are included within the newly-determined region with "apparent area", instead of between the "provisional boundary lines" as determined in (2) above, and that have a circle equivalent diameter of from 1 to 60 µm and satisfy the expression $L/\{2(\pi S)^{1/2}\} \le 1.1$. At this time, the following approximation process (see FIG. 6) is performed, which was not performed in the aforementioned process of "Determination of Width of Division".

Figure 6A:
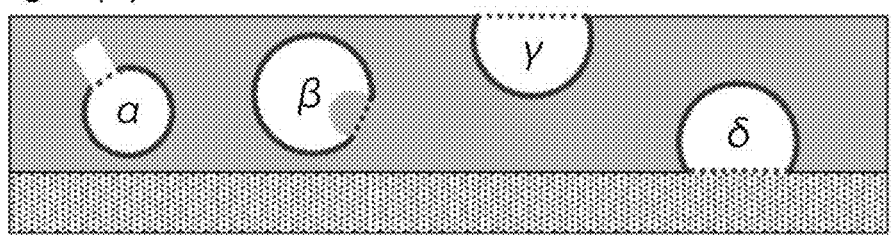
FIG. 6 is a schematic diagram for explaining a method for measuring the rate of approximately-perfect circular voids.
Figure 6B:
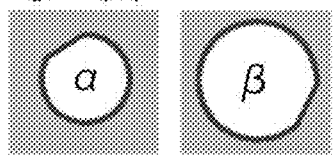
Figure 7:
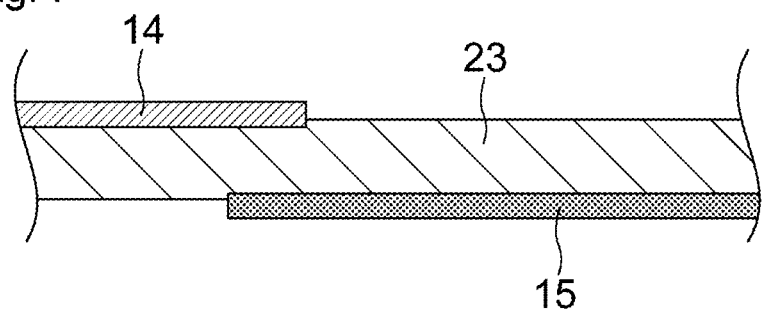
FIG. 7 is an enlarged diagram of the portion surrounded by the rectangle in FIG. 2.
Figure 8:
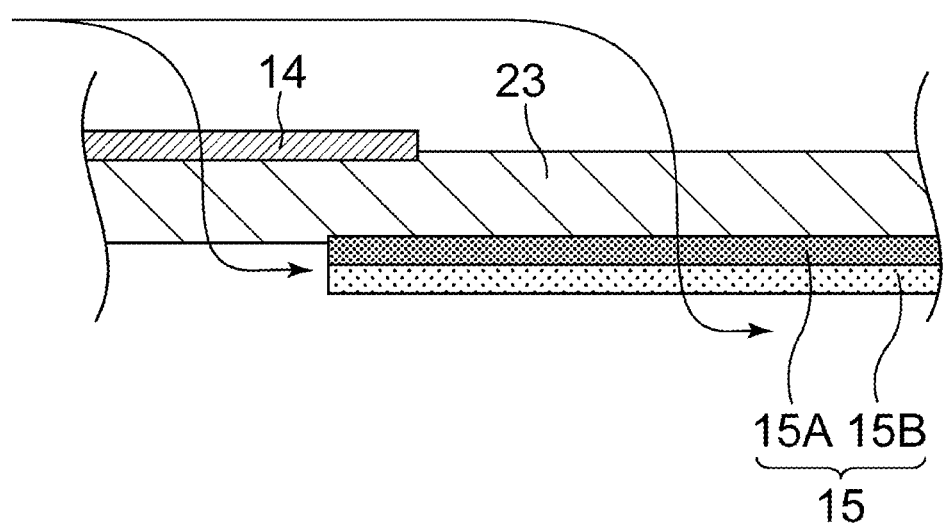
FIG. 8 is a diagram of a catalyst layer obtained by partially modifying the catalyst layer shown in FIG. 7.

There may be substantially-circular voids that are partially protruding or chipped and whose actual perimeter and area thus do not satisfy the expression $L/\{2(\pi S)^{1/2}\} \le 1.1$ (e.g., α and β illustrated in FIG. 6(a)). Such substantially-circular voids are subjected to the following process. If the ratio of the length of a dotted-line segment (i.e., the length of the dotted line illustrated in FIG. 6(a)), which connects both ends of the perimeter excluding the protruding/chipped portion (i.e., the solid line as illustrated in FIG. 6(a)), to the length of the solid-line perimeter is 30% or less, then the range surrounded by the dotted line and the solid line is deemed as a void, and it is determined whether or not the area surrounded by the dotted and solid lines and the perimeter, which is the total length of the dotted and solid lines, satisfy the expression $L/\{2(\pi S)^{1/2}\} \le 1.1$. If satisfied, the void is included in the calculation of the circular void percentage, by deeming the segment surrounded by the solid and dotted lines as the shape of the void. FIG. 6(b) illustrates virtual void shapes when α and β have been deemed as above. On the other hand, if the aforementioned ratio exceeds 30%, the aforementioned process is not performed, and the area and perimeter are calculated according to the general method, to determine whether the expression $L/\{2(\pi S)^{1/2}\} \le 1.1$ is satisfied. Voids that are partially chipped by the partition wall boundary line, the catalyst layer boundary line, or one of the two outermost division lines when viewed in the longitudinal direction (e.g., γ and δ illustrated in FIG. 6(a)) are subjected to the same process as that for α and β by using the void's perimeter excluding the boundary line (i.e., the length of the solid line) and the boundary line segment of the void (i.e., the length of the dotted line). Voids partially chipped by division lines are also subjected to the same process as that for α and β.

According to the aforementioned process, the total area of the approximately-perfect circular voids that exist within the aforementioned region with "apparent area" and have a circle equivalent diameter of from 1 to 60 µm is determined for the catalyst layer on the partition wall, and the ratio of the total area to the apparent area of the catalyst layer on the partition wall is calculated. The ratio is calculated for each of the fields-of-view, and the average value for 20 fields-of-view is taken as the circular void percentage. If, as a result of re-determining the aforementioned region, any of the fields-of-view ends up including no approximately-perfect circular void having a circle equivalent diameter of from 1 to 60 µm within the aforementioned region with "apparent area", another field-of-view is taken anew. Then, in the other field-of-view, division lines are drawn at intervals of the width of the division found as described above, and also, the region with "apparent area" is determined according to the aforementioned procedure using the EPMA observation image. In this way, the average value is calculated for 20 fields-of-view, each including at least one approximately-perfect circular void having a circle equivalent diameter of from 1 to 60 µm within the aforementioned region with "apparent area".

In the present invention, the circular void percentage, as obtained through observing a total of 20 fields-of-view in at least one observation surface in a single sample S, satisfies the aforementioned range. For example, 20 fields-of-view may be observed on each of a plurality of observation surfaces at different positions in the exhaust gas flow direction X. On this occasion, in a case where the circular void percentages vary on the different observation surfaces, it is considered that the requirement of the present invention is satisfied if the circular void percentage in any of the observation surfaces satisfies the aforementioned range. The same is also applied to the later-described circle equivalent diameter, the number of approximately-perfect circular voids per 1 mm², and the ratio of the catalyst portion's thickness to the thickness of the partition wall. The following feature (A) or (B) is further preferred.

(A) The circular void percentage satisfies the aforementioned range when observing 20 fields-of-view on either: an observation surface at a position on the upstream side that is within 10 mm from the upstream end, in the direction X, of the sample S and that does not overlap the sealing portion 25; or an observation surface at a position on the downstream side that is within 10 mm from the downstream end, in the direction X, of the sample S and that does not overlap the sealing portion 24.

(B) The circular void percentage satisfies the aforementioned range when observing a total of 20 fields-of-view, including 10 fields-of-view on the observation surface at the aforementioned upstream position, and 10 fields-of-view on the observation surface at the aforementioned downstream position.

In the feature (B), the average value of the circular void percentages of the 10 fields-of-view on the upstream side and the average value of the circular void percentages of the 10 fields-of-view on the downstream side are both preferably greater than 10% to 30% or less, more preferably from 11 to 20%, even more preferably from 12 to 15%.

In the catalyst layer on the partition wall as defined by the "partition wall boundary line" and the "catalyst layer boundary line", the average value of the circle equivalent diameters of approximately-perfect circular voids is from 1 to 60

μm. In this range, it is possible to determine the percentage of the circular voids that contribute to suppression of peeling, suppression of pressure loss, and improved PM collection performance. In view of further suppressing peeling and pressure loss as well as improving PM collection performance, the average value of the circle equivalent diameters is preferably from 5 to 50 μm, more preferably from 10 to 30 μm. The average value of the circle equivalent diameters is determined by first calculating, for each field-of-view, the average value of the circle equivalent diameters for the approximately-perfect circular voids having a circle equivalent diameter from 1 to 60 μm, and then averaging the average values for the 20 fields-of-view ultimately used for determining the circular void percentage.

The average number of approximately-perfect circular voids having a circle equivalent diameter from 1 to 60 μm, per 1 $mm^2$ of apparent area of the catalyst layer present on the partition wall, is preferably 250 or greater in view of suppressing pressure loss, and is preferably 4000 or fewer in view of PM collection performance and suppression of peeling. From these viewpoints, the average number of approximately-perfect circular voids having a circle equivalent diameter from 1 to 60 μm is more preferably from 400 to 2000, even more preferably from 550 to 1000, per 1 $mm^2$ of the aforementioned apparent area. The average number of approximately-perfect circular voids having a circle equivalent diameter from 1 to 60 μm, per 1 $mm^2$ of apparent area of the catalyst layer, is the average value for the 20 fields-of-view ultimately used for determining the circular void percentage.

The average thickness of the catalyst layer on the partition wall is preferably 8% or greater based on the average thickness of the partition wall, in view of PM collection performance, and preferably 20% or less in view of suppressing pressure loss. From these viewpoints, the average thickness of the catalyst layer on the partition wall is more preferably from 9 to 16%, even more preferably from 10 to 12%, based on the average thickness of the partition wall. The average thickness of the catalyst layer on the partition wall is determined in an observation image by dividing the apparent area of the catalyst layer on the partition wall by the distance between the two outermost division lines when viewed in the longitudinal direction of the observation image. The average thickness of the partition wall is determined in an observation image by dividing the area of a section surrounded by the partition wall's one outer edge (i.e., the partition wall boundary line), the partition wall's other outer edge (defined according to the same method as for the partition wall boundary line) and the two outermost division lines when viewed in the longitudinal direction of the observation image, by the distance between the two outermost division lines when viewed in the longitudinal direction of the observation image. In this way, the ratio of the thickness of the catalyst layer on the partition wall to the thickness of the partition wall is determined for each field-of-view. The average value of the thickness ratio is calculated from those of the 20 fields-of-view ultimately used for determining the circular void percentage, and the resulting average value is taken as the aforementioned ratio. In view of PM collection performance and suppression of pressure loss, the thickness of the partition wall is preferably from 200 to 270 μm, more preferably from 210 to 260 μm.

The circular void percentage as described hereinbefore can be obtained in the following manner: in the later-described suitable method for manufacturing the exhaust gas purification catalyst, a void forming reagent is used that has a specific shape, thermal decomposition onset temperature, particle size distribution, and swelling degree in a solvent, and also, the amount and particle size of the void forming reagent, and the size of metal oxide particles in the slurry, and the composition of the metal oxides (which affects the stability of the particle shape of the metal oxides) are appropriately tailored. The same is also applied to the number of approximately-perfect circular voids.

In view of further improving the PM collection rate and the effect of suppressing pressure loss, the mass of the catalyst portions, e.g. the first catalyst portions 14, may be tailored according to the amount of the catalytically active component. In view of improving the PM collection rate, the mass of the first catalyst portions after drying is preferably 10 g or greater, more preferably 20 g or greater, per 1 L of volume of the section in the substrate where the first catalyst portions 14 are formed. In view of reducing pressure loss and improving exhaust gas purification performance during high-speed operation, the mass of the first catalyst portions 14 after drying is preferably 80 g or less, more preferably 60 g or less, per 1 L of volume of the section in the substrate where the first catalyst portions 14 are formed. The mass of the second catalyst portions 15 may also be tailored according to the amount of the catalytically active component. In view of improving the PM collection rate, the mass of the second catalyst portions after drying is preferably 20 g or greater, more preferably 30 g or greater, per 1 L of volume of the section in the substrate where the second catalyst portions 15 are formed. In view of reducing pressure loss and improving exhaust gas purification performance during high-speed operation, the mass of the second catalyst portions 15 after drying is preferably 80 g or less, more preferably 60 g or less, per 1 L of volume of the section in the substrate where the second catalyst portions 15 are formed.

The volume of a section in the substrate here refers to the apparent volume including the substrate's partition walls 23, the first catalyst portions 14, the second catalyst portions 15, the pores in the partition walls 23, and the spaces within the cells 21 and 22. The "volume of the section in the substrate where the first catalyst portions 14 are formed" is the volume calculated as follows: Substrate's apparent volume×First catalyst portion 14's length L1 in direction X/Substrate 11's length L in direction X. The "volume of the section in the substrate where the second catalyst portions 15 are formed" is the volume calculated as follows: Substrate's apparent volume×Second catalyst portion 15's length L2 in direction X/Substrate 11's length L in direction X. (See FIG. 2 for L, L1, and L2.)

In view of further effectively balancing suppression of pressure loss, suppression of peeling and the PM collection rate, the pore volume resulting from pores having a pore diameter from 5 to 500 nm in the catalyst layers is preferably within a range from 0.020 to 0.20 $cm^3/g$. For example, the mercury intrusion method in accordance with JIS R 1655: 2003 can be employed as the method for measuring the pore volume, and AutoPore IV9520 from Shimadzu Corporation can be used as the measurement device.

The catalyst portions include a catalytically active component. Examples of the catalytically active component include platinum metals. Concrete examples include platinum (Pt), palladium (Pd), rhodium (Rh), ruthenium (Ru), iridium (Ir), and osmium (Os), and these may be used singly or in combination of two or more. In view of exhaust gas purification performance, it is preferable that the first catalyst layer 14 and the second catalyst layer 15 each independently include at least one of metal selected from platinum (Pt), palladium (Pd), and rhodium (Rh) as the catalytically active component. In cases where the catalyst portions include both the first catalyst layers 14 and the second catalyst layers 15, the catalytically active component in the first catalyst layers 14 and that in the second catalyst layers 15 may be the same or different from each other. The second catalyst layers 15 preferably include, as the catalytically active component, a catalytically active component different from that included in the first catalyst layers 14. For example, the following is particularly preferable in view of efficient removal of toxic components in exhaust gas, such as $NO_x$, CO and HC: the first catalyst layers 14 include a noble metal selected from platinum (Pt), palladium (Pd) and rhodium (Rh), and the second catalyst layers 15 includes a noble metal selected from platinum (Pt), palladium (Pd) and rhodium (Rh), the noble metal in the second catalyst layers 15 being different from the noble metal included in the first catalyst layers 14. In view of improving NOR removal performance, it is especially preferable that one of "the first catalyst layers 14" and "the second catalyst layers 15" (particularly the first catalyst layers 14) include rhodium (Rh). Particularly, when both the first catalyst layers 14 and the second catalyst layers 15 include rhodium (Rh) in the catalyst of the invention, such a catalyst of the invention will be suitable for the second or subsequent catalyst, which is important for NOR removal, in cases where two or more catalysts are arranged in a vehicle along the exhaust gas flow direction (i.e., the second or subsequent catalyst from the upstream side in cases where two or more exhaust gas purification catalysts are arranged along the exhaust gas flow direction).

In view of exhaust gas purification performance and cost, the content of the catalytically active component in the catalyst portions, e.g. the first catalyst layers 14 and/or the second catalyst layers 15, is preferably from 0.001 mass % to 25 mass %, more preferably from 0.01 mass % to 20 mass %, even more preferably from 0.05 mass % to 15 mass %, based on the total amount of components in the first catalyst layers 14 or that in the second catalyst layers 15.

The amount of the catalytically active component can be determined, for example, by completely dissolving the catalyst layers to obtain a solution and measuring the amount of noble metals in the solution with ICP-AES.

In cases where the catalyst layers are included within the substrate's partition wall, the amount can be determined by subtracting the amount of noble metals in a solution obtained by completely dissolving only the substrate from the amount of noble metals in a solution obtained by completely dissolving the catalyst layers and the substrate.

Preferred compositions of the catalyst portions are described in further detail. In view of efficiently delivering exhaust gas purification performance of the catalytically active component, the catalyst portions preferably include a catalyst support component for supporting the catalytically active component. Examples of the catalyst support component include metal oxide particles. Concrete examples of metal oxides for the metal oxide particles include inorganic oxides which are oxygen storage components (hereinbelow also called "OSC materials"), and inorganic oxides other than oxygen storage components. In the catalyst portion, the catalytically active component is preferably supported on both particles of an inorganic oxide which is an oxygen storage component and particles of an inorganic oxide other than an oxygen storage component.

Herein, "metal oxide particles" include calcined compacts in which metal oxide particles have been bonded together by calcining.

Herein, a state in which the catalytically active component is "supported" on metal oxide particles means that the catalytically active component is physically or chemically adsorbed or held on the outer surface of the metal oxide particles or on the inner surface of the pores of the metal oxide particles. Specifically, whether a catalytically active component is supported on metal oxide particles can be determined in the following manner, for example: a cross section of the exhaust gas purification catalyst 10 is analyzed using EDS to obtain an elemental map, and if the presence of a metal oxide component and that of a catalytically active component are confirmed in the same region of the elemental map, it is determined that the catalytically active component is "supported" on the metal oxide particles.

As the inorganic oxide as an oxygen storage component, a metal oxide having a polyvalent state and also having the capability of storing oxygen can be used. Examples thereof include $CeO_2$, CZ materials (ceria-zirconia complex oxides including Ce and Zr, or solid solutions of $CeO_2$ and $ZrO_2$), iron oxide, and copper oxide. An oxide of a rare-earth element other than Ce is also preferably used in view of thermal stability etc. Examples of the oxide of a rare-earth element other than Ce include $Sc_2O_3$, $Y_2O_3$, $La_2O_3$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $LU_2O_3$.

$CeO_2$—$ZrO_2$ is a solid solution of $CeO_2$ and $ZrO_2$. The formation of a solid solution of $CeO_2$ and $ZrO_2$ can be confirmed by checking whether or not a single phase derived from $CeO_2$—$ZrO_2$ is formed, using an X-ray diffractometer (XRD). $CeO_2$—$ZrO_2$ may be a solid solution that also contains the oxide of a rare earth element other than Ce.

Examples of the inorganic oxides other than oxygen storage components that may be included in the catalyst portion include metal oxides other than oxygen storage components, and specific examples thereof include alumina, silica, silica-alumina, titania, and aluminosilicates. Particularly, alumina is preferably used in view of excellent heat resistance.

In cases where the catalyst portions include both the first catalyst layers 14 and the second catalyst layers 15, the features of the compositions of the catalyst portions described above preferably apply to both the first catalyst layers 14 and the second catalyst portions 15.

In addition to having a specific circular void percentage, the catalyst portions preferably has a high content of zirconium element in terms of oxide (amount of $ZrO_2$). A circular void percentage of greater than 10% and 30% or less delivers excellent PM collection performance and suppression of pressure loss, but results in many thin portions in the catalyst portion, thereby making the catalyst portion relatively brittle. The poor strength of the catalyst portion decreases the adhesiveness of the catalyst portion to the substrate, which is an adverse effect of pressure loss reduction, and may result in an impractical product. As a countermeasure, the inventors have found that increasing the amount of $ZrO_2$ in the catalyst portions, which are rendered partially thin by the high circular void percentage, achieves high adhesiveness of the catalyst portions to the substrate. The reason why an increase in the amount of $ZrO_2$ favorably suppresses peeling of the catalyst portions is probably because of characteristics of $ZrO_2$, including the high melting point; large bond-dissociation energy with oxygen; high flexural strength and fracture toughness, which lead to durability to mechanical action; and small change in specific surface area before and after calcinating. Specifically, the amount of $ZrO_2$ in the catalyst portions is preferably 35 mass % or greater, more preferably 45 mass % or greater, even more preferably 50 mass % or greater. In view of securing a sufficient amount of $CeO_2$ in the catalyst portions to enhance oxygen storage capacity (OSC), the content of zirconium element in terms of oxide (amount of $ZrO_2$) in the catalyst portions is preferably 85 mass % or less, more preferably 75 mass % or less, even more preferably 65 mass % or less.

For example, in cases where the catalyst portions include $CeO_2$ and $ZrO_2$, the mass ratio of the content of cerium element in terms of oxide (amount of $CeO_2$) to the content of zirconium element in terms of oxide (amount of $ZrO_2$) in the catalyst portions, $CeO_2/ZrO_2$, is preferably 0.8 or less, more preferably 0.5 or less, most preferably 0.3 or less, in view of effectively preventing peeling. In view of OSC, the ratio $CeO_2/ZrO_2$ is preferably 0.03 or greater.

Further, in cases where the catalyst portions include alumina, the mass ratio of the content of zirconium element in terms of oxide (amount of $ZrO_2$) to the content of aluminum element in terms of oxide (amount of $Al_2O_3$), $ZrO_2/Al_2O_3$, is preferably 1.5 or greater, more preferably 2.5 or greater, even more preferably 3.5 or greater. In view of OSC, the ratio $ZrO_2/Al_2O_3$ is preferably 10 or less.

Further, in cases where the catalyst portions include alumina and ceria, the mass ratio of the total of the content of zirconium element in terms of oxide (amount of $ZrO_2$) and the content of cerium element in terms of oxide (amount of $CeO_2$) to the content of aluminum element in terms of oxide (amount of $Al_2O_3$) in the catalyst portions, $(ZrO_2+CeO_2)/Al_2O_3$, is preferably 3.0 or greater, more preferably 3.5 or greater, even more preferably 4.0 or greater. In view of OSC, the ratio $(ZrO_2+CeO_2)/Al_2O_3$ is preferably 10 or less.

Typically, the shape of $ZrO_2$ particles tends to be stable, whereas the shape of $Al_2O_3$ particles tends to be unstable. Thus, generally speaking, a composition having a large value of $ZrO_2/Al_2O_3$ tends to have a high circular void percentage compared to a composition having a small value of $ZrO_2/Al_2O_3$.

In view of balancing heat resistance and OSC, the content of cerium element in terms of oxide (amount of $CeO_2$) in the catalyst portions is preferably from 5 mass % to 40 mass %, more preferably from 10 mass % to 30 mass %.

Herein, "the content of cerium element in terms of oxide (amount of $CeO_2$)" and "the content of zirconium element in terms of oxide (amount of $ZrO_2$)" in the catalyst portions include the amounts of $CeO_2$ and $ZrO_2$ in solid-solution form, respectively, and also include the amount of Ce in terms of $CeO_2$ and the amount of Zr in terms of $ZrO_2$ in ceria-zirconia complex oxides, respectively. For example, the amount of $CeO_2$ and the amount of $ZrO_2$ can be determined by completely dissolving the catalyst layers to obtain a solution, measuring the amounts of Ce and Zr in the solution with ICP-AES, and converting the found amounts into amounts of respective oxides.

In cases where the catalyst layers are included within the substrate's partition wall, the amount can be determined by subtracting the amounts of Ce and Zr in a solution obtained by completely dissolving only the substrate from the amounts of Ce and Zr in a solution obtained by completely dissolving the catalyst layers and the substrate.

In view of balancing heat resistance, OSC and suppression of pressure loss, the content of the inorganic oxides other than the oxygen storage component in the catalyst portions is preferably from 4 mass % to 50 mass %, more preferably from 7 mass % to 30 mass %. For example, the content of aluminum element in terms of oxide (amount of $Al_2O_3$) can be determined by completely dissolving the catalyst layers to obtain a solution, measuring the amount of aluminum in the solution with ICP-AES, and converting the found amount into the amount of oxide.

In cases where the catalyst layers are included within the substrate's partition wall, the amount can be determined by subtracting the amount of Al in a solution obtained by completely dissolving only the substrate from the amount of Al in a solution obtained by completely dissolving the catalyst layers and the substrate.

In cases where the catalyst portions include the first catalyst layers 14 and the second catalyst layers 15, the above-described features of the amount of $ZrO_2$, the amount of $CeO_2$ and/or the amount of $Al_2O_3$ may apply only to either one of "the first catalyst layers 14" or "the second catalyst layers 15" of the catalyst portions, or may apply to both. Preferably, both the first catalyst layers 14 and the second catalyst layers 15 have the following features.

The features of the exhaust gas purification catalyst 10 are described in further detail.

In view of further improving PM collection performance and improving exhaust gas purification performance during high-speed operation, the first catalyst layer 14 is preferably present mainly on the surface of the partition wall 23 and not within the partition wall 23. "The first catalyst layer 14 is present mainly on the surface of the partition wall 23" means that, in a cross section of the substrate 11 on which the first catalyst layers 14 are provided, the mass of the first catalyst layer 14 present on the surface of the substrate 11's partition wall 23 is greater than the mass of the first catalyst layer 14 present within the partition wall 23. Whether or not a catalyst layer is mainly present on the surface can be checked in the following manner: a cross section of the partition wall on which the first catalyst layer 14 is provided is observed with a scanning electron microscope (JEM-ARM200F from JEOL Ltd.) and also analyzed with energy dispersive X-ray spectrometry (EDS), to thereby line-analyze the boundary between the distribution of elements (for example, Si, and Mg) that exist only in the substrate and the distribution of elements (for example, Ce and Zr) that exist only in the catalyst layer. Alternatively, that can also be checked by analyzing the cross section with an electron probe micro analyzer (EPMA). Also, the second catalyst layer 15 is preferably present mainly on the surface of the partition wall 23 and not within the partition wall 23.

In view of delivering suitable PM collection performance while reducing pressure loss, the length L1 (see FIG. 2), in the direction X, of the first catalyst layer 14 is preferably from 10 to 80%, more preferably from 30 to 60%, based on the length L (see FIG. 2), in the direction X, of the substrate 11. In view of improving PM collection performance while reducing pressure loss, the length L2 (see FIG. 2), in the direction X, of the second catalyst layer 15 is preferably from 30 to 90%, more preferably from 50 to 80%, based on the length L, in the direction X, of the substrate 11. It is preferable to form the first catalyst layer 14 from the upstream end in the exhaust gas flow direction, and to form the second catalyst layer 15 from the downstream end in the exhaust gas flow direction.

In view of improving exhaust gas purification performance, the total length of the first catalyst layer 14's length L1 in the direction X and the second catalyst layer 15's length L2 in the direction X, L1+L2, is preferably longer than the substrate 11's length L in the direction X; and (L1+L2)/L is preferably 1.05 or greater, more preferably 1.10 or greater.

The length of the first catalyst layer 14 and the second catalyst layer 15 can be measured according to the following method. Specifically, it is preferable to visually observe the exhaust gas purification catalyst 10 to determine the boundary of the first catalyst layer 14 and the boundary of the second catalyst layer 15, and then measure the length of each of the first catalyst layer 14 and the second catalyst layer 15. At this time, it is preferable to measure the length of each of the first catalyst layer 14 and the second catalyst layer 15 at, for example, ten discretionary sites in the exhaust gas purification catalyst 10, and determine the respective average values as the length of the first catalyst layer 14 and that of the second catalyst layer 15. If it is impossible to visually determine the boundary, in the exhaust gas flow direction, of the first catalyst layer 14, the second catalyst layer 15, the lower layer 15A and/or the upper layer 15B, the boundary can be identified in the following manner: the composition is analyzed at multiple positions (e.g., 8 to 16 positions) on the exhaust gas purification catalyst along the exhaust gas flow direction, and the boundary is identified on the basis of the content of a catalytically active component in the composition at each position. The content of a catalytically active component at each position can be determined by, for example, X-ray fluorescence analysis (XRF) or ICP emission spectrometry (ICP-AES).

In view of achieving both ease of manufacturing and exhaust gas purification performance, it is preferable to form the first catalyst layers 14 so as to extend from the substrate 11's upstream end portion R1 toward the downstream side in the direction X. It is also preferable to form the second catalyst layers 15 so as to extend from the substrate 11's downstream end portion R2 toward the upstream side in the direction X. Further, in cases where the second catalyst layers 15 each include a lower layer 15A and an upper layer 15B as described below, it is preferable to form the lower layer 15A and the upper layer 15B so as to extend from the substrate 11's downstream end portion R2 toward the upstream side in the direction X.

Next, a preferable method for manufacturing an exhaust gas purification catalyst according to the present invention is described below.

In this manufacturing method, catalyst portions are formed in a substrate, and the substrate includes: inflow-side cells, each inflow-side cell being a space having an open end on an inflow side thereof and a closed end on an outflow side thereof in an exhaust gas flow direction; outflow-side cells, each outflow-side cell being a space having a closed end on an inflow side thereof and an open end on an outflow side thereof in the exhaust gas flow direction; and porous partition walls, each porous partition wall separating the inflow-side cell and the outflow-side cell from each other. More specifically, first, a slurry for forming catalyst portions, the slurry including a void forming reagent, is applied to a surface of the partition walls facing the inflow-side cell and/or a surface of the partition walls facing the outflow-side cell, and then, the slurry applied to the substrate is calcinated to eliminate the void forming reagent, to thereby form the catalyst portions including a plurality of voids. In view of satisfying the circular void percentage within the aforementioned range, at least 90% of the particles of the void forming reagent preferably has a roundness of $L/\{2(\pi S)^{1/2}\} \leq 1.05$, and the thermal decomposition onset temperature of the void forming reagent is preferably 200° C. or higher. Further, the content of zirconium element in terms of oxide (amount of $ZrO_2$) is preferably from 35 mass % to 85 mass % based on the solid contents excluding the void forming reagent in the slurry.

In the void forming reagent added to the slurry for forming catalyst portions in the present manufacturing method, at least 90% of the particles of the void forming reagent, in terms of the number of particles, preferably has a roundness of $L/\{2(\pi S)^{1/2}\} \leq 1.05$. This enables an exhaust gas purification catalyst 10 having the aforementioned circular void percentage to be obtained easily. Herein, the "roundness" is measured through observation with a SEM. A sample to be observed can be obtained by: bonding a carbon tape onto a SEM sample stage; dropping a powder sample attached to a cotton bud, from above onto the stage; and then blowing away excessive powder with an air gun. For example, air may be blown with the air gun from a position separated by 10 cm at 5 atmospheres (gauge pressure) for 1 second, though the condition is not limited thereto.

SEM observation is preferably performed at an acceleration voltage of 5 to 15 kV under an observation magnification of 40× to 1000×. SEM images of discretionarily selected 50 particles of the void forming reagent are observed, to determine the percentage of the void forming reagent particles whose contour in the SEM image has a roundness of $L/\{2(\pi S)^{1/2}\} \leq 1.05$.

In view of achieving the aforementioned circular void percentage more easily, the percentage of the void forming reagent particles having a roundness of $L/\{2(\pi S)^{1/2}\} \leq 1.05$ is more preferably 95% or greater, even more preferably 98% or greater.

The void forming reagent used in the present manufacturing method preferably has a thermal decomposition onset temperature of 200° C. or higher in the atmosphere. The void forming reagent with a high thermal decomposition temperature typically has a high degree of crosslinking of molecular chains. This prevents the shape of the void forming reagent from getting deformed during calcinating, thereby allowing voids with high roundness to be left in the catalyst portion, and thus facilitating manufacturing of an exhaust gas purification catalyst 10 having the aforementioned circular void percentage. The thermal decomposition onset temperature of the void forming reagent in the atmosphere is more preferably 250° C. or higher, even more preferably 270° C. or higher. In view of making the void forming reagent disappear reliably during calcinating, the thermal decomposition onset temperature is preferably 550° C. or lower, more preferably 500° C. or lower. As regards the thermal decomposition temperature, for example, the thermal decomposition behavior is analyzed in the atmosphere by raising the temperature from room temperature to 500° C. The rate of temperature rise may be from 5 to 20° C./minute, for example. The thermal decomposition onset temperature is determined from the intersection point between: a line parallel to the horizontal axis and passing through the mass before starting of heating in the test; and a tangent drawn so as to maximize the gradient between inflection points in the decomposition curve. In Examples described later, the thermal decomposition onset temperature in the atmosphere is simply described as "thermal decomposition onset temperature".

In the particle size distribution of the void forming reagent as measured according to the laser diffraction particle size distribution method, the value of (D90-D10)/D50 is preferably from 0.1 to 1.1, wherein the particle size at a cumulative volume of 10% is designated as D10, the particle size at a cumulative volume of 50% is designated as D50, and the particle size at a cumulative volume of 90% is designated as D90. The value of (D90-D10)/D50 (hereinbelow also called "monodispersity") is a measure indicating the particle size distribution of the void forming reagent; the smaller the value of the monodispersity, the sharper the particle size distribution. The void forming reagent with a sharp particle size distribution has a high degree of crosslinking, and are thus excellent in terms of further suppressing deformation of the void forming reagent during calcinating due to thermal expansion, thereby allowing the aforementioned circular void percentage to be achieved more easily. From this viewpoint, the monodispersity of the void forming reagent is preferably 0.7 or less, more preferably 0.3 or less. In view of obtaining voids having the aforementioned circle equivalent diameter, D50 of the void forming reagent is preferably from 5 to 50 μm, more preferably from 10 to 30 μm. In view of monodispersity, D90 of the void forming reagent is preferably from 8 to 60 μm, more preferably from 15 to 40 μm. From the same viewpoint, D10 is preferably from 2 to 40 μm, more preferably from 5 to 20 μm. The monodispersity and particle size can be determined using, for example, a laser diffraction/scattering particle size/particle size distribution analyzer, such as Microtrac HRA or the Microtrac 3000 series from MicrotracBEL Corp. For example, analysis can be performed as follows. An automatic sample feeder (Microtorac SDC from MicrotracBEL Corp.) for a laser diffraction particle size distribution analyzer is used; void forming reagent particles are added to an aqueous dispersion medium, followed by application of ultrasonic waves at 40 W to the resulting mixture at a flow rate of 40% for 360 seconds. Then, measurement is performed using a laser diffraction/scattering method particle size distribution analyzer (Microtrac MT3300 EXII from MicrotracBEL Corp.). The measurement conditions are as follows: particle refractive index: 1.5; particle shape: perfect sphere; solvent refractive index: 1.3; set zero: 30 seconds; measurement time: 30 seconds. Measurement is performed twice, and the average value is calculated. Pure water is used as the aqueous dispersion medium.

It is also preferable that the void forming reagent used in the present manufacturing method have a low swelling degree in a solvent. This is because a void forming reagent with a low swelling degree has a high degree of crosslinking. For example, the amount (g) of solvent absorbed per 1 g of polymer after immersion at 50° C. for 48 hours is preferably 0.05 g/g or less in ethanol, preferably 0.7 g/g or less in acetone, preferably 0.15 g/g or less in 2-methoxyethanol, and preferably 0.15 g/g or less in toluene.

Examples of materials for the void forming reagent include polymers of monomers having an ethylenically unsaturated bond including crosslinkable monomers, and crosslinked acrylic resin and crosslinked styrene resin are usable, for example. Particularly, crosslinked polystyrene particles or crosslinked poly(meth)acrylic ester particles can be used, for example. Examples of crosslinked poly(meth)acrylic ester particles include crosslinked poly(methyl (meth)acrylate) particles and crosslinked poly(butyl (meth)acrylate) particles.

The amount of the void forming reagent is preferably greater than 15 mass % to 40 mass % or less, more preferably greater than 20 mass % to 35 mass % or less relative to the solid contents excluding the void forming reagent in the slurry for forming catalyst portions.

Further, the slurry including the void forming reagent preferably includes a catalytically active component and metal oxide particles for supporting the catalytically active component. Examples of the metal oxide particles include particles of an inorganic oxide which is an oxygen storage component and particles of an inorganic oxide other than an oxygen storage component, as described above as constituent components of the catalyst portion.

In view of improving the dispersibility of the catalytically active component and improving PM collection performance, D50 of the particle size of the metal oxide particles in the catalyst portion is preferably 1 μm or greater, more preferably 2 μm or greater, and D90 thereof is preferably 7 μm or greater, more preferably 15 μm or greater. In view of improving the dispersibility of the catalytically active component, D50 of the particle size of the metal oxide particles in the slurry is preferably 40 μm or less, and D90 thereof is preferably 80 μm or less.

D50 and D90 of the metal oxide particles may be the particle size in a state where the metal oxide particles support the catalytically active component, or the particle size before the metal oxide particles support the catalytically active component. D50 and D90 may be equal to or above the aforementioned preferable lower limit, or equal to or below the aforementioned preferable upper limit, either before or after supporting the catalytically active component. D50 and D90 of the metal oxide particles can be determined according to the same method as that for D50 and D90 of the void forming reagent.

The slurry can be obtained by mixing the catalytically active component in the form of a water-soluble salt, such as a nitrate, with the metal oxide particles, and the slurry can be applied to the substrate 11 and then dried or calcinated. Alternatively, the catalytically active component can be supported by the metal oxide particles in advance, and then the catalytically active component supported on the metal oxide particles can be made into a slurry.

In the slurry, the composition of the solid contents excluding the void forming reagent is preferably the same as the preferable composition described above for the catalyst portions of the exhaust gas purification catalyst 10. Therefore, the content of zirconium element in terms of oxide (amount of $ZrO_2$) in the slurry is preferably from 35 to 85 parts by mass based on 100 parts by mass of components of the solid contents excluding the void forming reagent.

In the first step, the slurry including the aforementioned constituent components is applied to the surfaces of the partition walls that each face the inflow-side cell and/or the surfaces of the partition walls that each face the outflow-side cell. In order to apply the slurry to the partition wall's surfaces that each face the inflow-side cell, the substrate 11's upstream side in the exhaust gas flow direction may be immersed in the slurry, for example. In order to apply the slurry to the partition wall's surfaces that each face the outflow-side cell, the substrate 11's downstream side in the exhaust gas flow direction may be immersed in the slurry, for example. The slurry may be sucked from the other side simultaneously with the immersion.

In the second step, the slurry applied to the substrate is calcinated, to eliminate the void forming reagent and form the catalyst portions including a plurality of voids. In view of preventing deterioration in catalyst activity and successfully calcinating successfully calcinating and eliminating the void forming reagent, the calcinating temperature is preferably from 350 to 550° C. In cases of drying the slurry before calcinating, the drying temperature is preferably from 40 to 120° C. Calcinating is typically performed in the atmosphere.

The exhaust gas purification catalyst 10 manufactured as above can be used for various applications as an exhaust gas purification catalyst for internal combustion engines that employ fossil fuel as a source of power, such as gasoline engines, by taking advantage of PM collection performance and pressure loss prevention performance as well as peeling prevention performance. Further, according to the present embodiment, there can also be provided an exhaust gas purification method involving use of the exhaust gas purification catalyst 10. For example, exhaust gas from the gasoline engine can be purified favorably when the exhaust gas purification catalyst 10 is set in an exhaust path of an internal combustion engine such as a gasoline engine, and particularly a GDI engine of a vehicle, and is used as a GPF etc. Particularly, in cases where two or more exhaust gas purification catalysts are arranged along the exhaust gas flow direction in an exhaust gas purification device, the exhaust gas purification catalyst 10 is preferably used as the second or subsequent catalyst from the upstream side. The reason for this is as follows: because the nature of filter catalysts constrains the amount of the slurry applied, use of the present exhaust gas purification catalyst as the first catalyst, which is subjected to high thermal load, will promote degradation, whereas use of the present exhaust gas purification catalyst as the second or subsequent catalyst can favorably maintain high purification performance and PM collection performance.

EXAMPLES

The present invention is described in further detail below by way of examples. The scope of the present invention, however, is not limited to the examples.

Drying and calcinating were all performed in the atmosphere. The thermal decomposition onset temperature in each example was measured in the atmosphere. In the following examples, the amount of a void forming reagent relative to solid contents all means the amount relative to solid contents excluding the void forming reagent.

Example 1

1. Preparation of First Slurry:

$CeO_2$—$ZrO_2$ solid solution powder (the $CeO_2$—$ZrO_2$ solid solution contained 15 mass % of $CeO_2$, 70 mass % of $ZrO_2$, and 15 mass % of an oxide of a rare-earth element other than Ce) and alumina powder were provided. The $CeO_2$—$ZrO_2$ solid solution powder and the alumina powder were mixed, and immersed in a rhodium nitrate aqueous solution.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount (g) of solvent absorbed per 1 g of polymer after immersion at 50° C. for 48 hours: 0.02 g/g in ethanol, 0.24 g/g in acetone, 0.05 g/g in 2-methoxyethanol, and 0 g/g in toluene); alumina sol; zirconia sol; and water as a liquid solvent were mixed to prepare a first slurry. Here, the "roundness" is the percentage, in terms of number, of particles satisfying $L/\{2(\pi S)^{1/2}\} \leq 1.05$ among the particles of the spherical void forming reagent. The amount of the $CeO_2$—$ZrO_2$ solid solution powder was 80 parts by mass, the amount of the alumina powder was 11 parts by mass, the amount of the alumina sol was 3.0 parts by mass, the amount of the zirconia sol was 5.0 parts by mass, and the amount of Rh was 1.0 part by mass in terms of metal, all based on 100 parts by mass of the components (excluding the void forming reagent) of the solid contents of the slurry. The mass percentage of the void forming reagent was 20% relative to the solid contents of the slurry. D50 of the metal oxides in the slurry was 8 μm, and D90 thereof was 22 μm. SEM observation for measuring the roundness of the void forming reagent as a raw material was performed at an acceleration voltage of 15 kV and an observation magnification of 600×.

2. Forming Precursor of First Catalyst Portion:

A substrate 11 having the structure illustrated in FIG. 1 was used. The substrate 11 had a volume of 1.0 L and an entire length of 91 mm, and included 300 cells/inch in a plane vertical to the axial direction, each cell extending in the axial direction and being defined by partition walls each having a thickness of 200 to 250 μm. In the substrate 11, the area of the opening of a single inflow-side cell 21 in the end face on the inflow-side was substantially the same as the area of the opening of a single outflow-side cell 22 in the end face on the outflow-side.

The upstream-side end portion of the substrate 11 in the exhaust gas flow direction was immersed in the first slurry, and the slurry was drawn by suction from the downstream side. Then the slurry was dried at 70° C. for 10 minutes. In this way, a layer made of the solid contents of the first slurry (i.e., a precursor of the first catalyst portion) was formed on each partition wall 23's surface that faced the inflow-side cell 21.

3. Forming Precursor of Second Catalyst Portion:

The downstream-side end portion of the substrate 11 in the exhaust gas flow direction after drying was immersed in the first slurry, and the slurry was drawn by suction from the upstream side. Then the slurry was dried at 70° C. for 10 minutes. In this way, a layer made of the solid contents of the first slurry (i.e., a precursor of the second catalyst portion) was formed on each partition wall 23's surface that faced the outflow-side cell 22.

4. Calcinating:

The substrate 11 was then calcinated at 450° C. for 1 hour, whereby an exhaust gas purification catalyst 10 of Example 1 having first catalyst portions 14 and second catalyst portions 15 formed in the substrate 11 was obtained.

In the exhaust gas purification catalyst of Example 1, the first catalyst portion 14 was formed on each partition wall 23's surface on the inflow-side cell 21-side so as to extend from the upstream-side end portion R1 toward the downstream side in the exhaust gas flow direction X by a length of 45% based on the entire length L. The mass of the first catalyst portions 14 after calcinating per volume of the section in the substrate where the first catalyst portions 14 were formed was 52 g/L. The second catalyst portion 15 of the exhaust gas purification catalyst 10 was formed on each partition wall 23's surface on the outflow-side cell 22-side so as to extend from the downstream-side end portion R2 toward the upstream side in the exhaust gas flow direction X by a length of 70% based on the entire length L. The mass of the second catalyst portions 15 after calcinating per volume of the section in the substrate where the second catalyst portions 15 were formed was 52 g/L.

Example 2

An exhaust gas purification catalyst 10 was obtained as in Example 1, except that the mass percentage of the void forming reagent in the first slurry was changed to 30% relative to the solid contents of the slurry.

Example 3

An exhaust gas purification catalyst 10 was obtained as in Example 1, except that the mass percentage of the void forming reagent in the first slurry was changed to 40% relative to the solid contents of the slurry.

Example 4

An exhaust gas purification catalyst 10 was obtained as in Example 1, except that the void forming reagent in Example 1 was replaced with that described below, and that the mass percentage of the void forming reagent was changed to 50% relative to the solid contents of the slurry. The void forming reagent used in Example 4 was a spherical void forming reagent having D50 of 5 μm (material: crosslinked poly (methyl (meth)acrylate) particles; D90: 7 μm; D10: 3 μm; monodispersity: 0.120; thermal decomposition onset temperature: 250° C.; roundness: 95%; amount (g) of solvent absorbed per 1 g of polymer after immersion at 50° C. for 48 hours: 0.03 g/g in ethanol, 0.43 g/g in acetone, 0.08 g/g in 2-methoxyethanol, and 0.02 g/g in toluene).

Example 5

An exhaust gas purification catalyst 10 was obtained as in Example 1, except that the void forming reagent in Example 1 was replaced with a spherical void forming reagent having D50 of 50 μm (material: crosslinked poly(methyl (meth) acrylate) particles; D90: 80 μm; D10: 28 μm; monodispersity: 1.039; thermal decomposition onset temperature: 250° C.; roundness: 90%; amount (g) of solvent absorbed per 1 g of polymer after immersion at 50° C. for 48 hours: 0.04 g/g in ethanol, 0.66 g/g in acetone, 0.12 g/g in 2-methoxyethanol, and 0.12 g/g in toluene).

Example 6

An exhaust gas purification catalyst 10 was obtained as in Example 1, except that preparation of the first slurry in Example 1 was modified as follows.

Modification of Preparation of Slurry:

Zirconia powder and alumina powder were provided. The zirconia powder and the alumina powder were mixed, and immersed in a rhodium nitrate aqueous solution.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount (g) of solvent absorbed per 1 g of polymer after immersion at 50° C. for 48 hours: 0.02 g/g in ethanol, 0.24 g/g in acetone, 0.05 g/g in 2-methoxyethanol, and 0 g/g in toluene); alumina sol; zirconia sol; and water as a liquid solvent were mixed to prepare a slurry. The amount of the zirconia powder was 80 parts by mass, the amount of the alumina powder was 11 parts by mass, the amount of the alumina sol was 3.0 parts by mass, the amount of the zirconia sol was 5.0 parts by mass, and the amount of Rh was 1.0 part by mass in terms of metal, all based on 100 parts by mass of the components (excluding the void forming reagent) of the solid contents of the slurry. D50 of the metal oxides in the slurry was 6 μm, and D90 thereof was 20 μm. The mass percentage of the void forming reagent was 15% relative to the solid contents of the slurry.

Example 7

An exhaust gas purification catalyst 10 was obtained as in Example 1, except that preparation of the first slurry in Example 1 was modified as follows, and that the amount of the catalyst portions was changed.

Modification of Preparation of Slurry:

Zirconia powder and alumina powder were provided. The zirconia powder and the alumina powder were mixed, and immersed in an aqueous solution of rhodium nitrate and palladium nitrate.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount of solvent absorbed (g) per 1 g of polymer after immersion at 50° C. for 48 hours: 0.02 g/g in ethanol, 0.24 g/g in acetone, 0.05 g/g in 2-methoxyethanol, and 0 g/g in toluene); barium hydroxide; alumina sol; zirconia sol; ceria sol; and water as a liquid solvent were mixed to prepare a slurry. The amount of the zirconia powder was 75 parts by mass, the amount of the alumina powder was 8.7 parts by mass, the amount of barium hydroxide was 5.9 parts by mass, the amount of the alumina sol was 3.0 parts by mass, the amount of the zirconia sol was 3.7 parts by mass, the amount of the ceria sol was 2.0 parts by mass, the amount of Rh was 0.4 parts by mass in terms of metal, and the amount of Pd was 1.3 parts by mass in terms of metal, all based on 100 parts by mass of the components (excluding the void forming reagent) of the solid contents of the slurry. D50 of the metal oxides in the slurry was 10 μm, and D90 thereof was 25 μm. The mass percentage of the void forming reagent was 30% relative to the solid contents of the slurry. The mass of the first catalyst portions after calcinating per volume of the substrate in the section where the first catalyst portions were formed was 39 g/L. The mass of the second catalyst portions after calcinating per volume of the substrate in the section where the second catalyst portions were formed was 39 g/L.

Example 8

An exhaust gas purification catalyst 10 was obtained as in Example 1, except that preparation of the first slurry in Example 1 was modified as follows, and that the amount of the catalyst portions was changed.

Modification of Preparation of Slurry:

$CeO_2$—$ZrO_2$ solid solution powder A (the $CeO_2$—$ZrO_2$ solid solution contained 42 mass % of $CeO_2$, 46 mass % of $ZrO_2$, and 12 mass % of an oxide of a rare-earth element other than Ce), $CeO_2$—$ZrO_2$ solid solution powder B having a different composition from that of powder A (the $CeO_2$—$ZrO_2$ solid solution contained 15 mass % of $CeO_2$, 70 mass % of $ZrO_2$, and 15 mass % of an oxide of a rare-earth element other than Ce), and alumina powder were provided. The $CeO_2$—$ZrO_2$ solid solution powders and the alumina powder were mixed, and immersed in an aqueous solution of rhodium nitrate and palladium nitrate.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount (g) of solvent absorbed per 1 g of polymer after immersion at 50° C. for 48 hours: 0.02 g/g in ethanol, 0.24 g/g in acetone, 0.05 g/g in 2-methoxyethanol, and 0 g/g in toluene); barium hydroxide; alumina sol; zirconia sol; ceria sol; and water as a liquid solvent were mixed to prepare a slurry. The amount of the $CeO_2$—$ZrO_2$ solid solution powder A was 40 parts by mass, the amount of the $CeO_2$—$ZrO_2$ solid solution powder B was 27 parts by mass, the amount of the alumina powder was 17 parts by mass, the amount of barium hydroxide was 5.6 parts by mass, the amount of the alumina sol was 3 parts by mass, the amount of the zirconia sol was 3.7 parts by mass, the amount of the ceria sol was 2.0 parts by mass, the amount of Rh was 0.4 parts by mass in terms of metal, and the amount of Pd was 1.3 parts by mass in terms of metal, all based on 100 parts by mass of the components (excluding the void forming reagent) of the solid contents of the slurry. D50 of the metal oxides in the slurry was 20 μm, and D90 thereof was 35 μm. The mass percentage of the void forming reagent was 30% relative to the solid contents of the slurry. The mass of the first catalyst portions after calcinating per volume of the substrate in the section where the first catalyst portions were formed was 39 g/L. The mass of the second catalyst portions after calcinating per volume of the substrate in the section where the second catalyst portions were formed was 39 g/L.

Example 9

An exhaust gas purification catalyst 10 was obtained as in Example 1, except that preparation of the first slurry in Example 1 was modified as follows.

Modification of Preparation of Slurry:

Zirconia powder was provided. The zirconia powder was immersed in a rhodium nitrate aqueous solution.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount (g) of solvent absorbed per 1 g of polymer after immersion at 50° C. for 48 hours: 0.02 g/g in ethanol, 0.24 g/g in acetone, 0.05 g/g in 2-methoxyethanol, and 0 g/g in toluene); alumina sol; zirconia sol; and water as a liquid solvent were mixed to prepare a slurry. The amount of the zirconia powder was 92.5 parts by mass, the amount of the alumina sol was 1.5 parts by mass, the amount of the zirconia sol was 5.0 parts by mass, and the amount of Rh was 1.0 part by mass in terms of metal, all based on 100 parts by mass of the components (excluding the void forming reagent) of the solid contents of the slurry. D50 of the metal oxides in the slurry was 7 μm, and D90 thereof was 20 μm. The mass percentage of the void forming reagent was 20% relative to the solid contents of the slurry.

Comparative Example 1

An exhaust gas purification catalyst 10 was obtained as in Example 1, except that the amount of the void forming reagent in the first slurry was changed to 50 mass % relative to the solid contents of the slurry.

Comparative Example 2

An exhaust gas purification catalyst was obtained as in Example 1, except that no void forming reagent was used in the preparation of the slurry.

Comparative Example 3

An exhaust gas purification catalyst was obtained as in Example 1, except that the amount of the void forming reagent in the first slurry was changed to 10 mass % relative to the solid contents of the slurry.

Comparative Example 4

An exhaust gas purification catalyst 10 was obtained as in Example 1, except that preparation of the first slurry in Example 1 was modified as follows.

Modification of Preparation of Slurry:

$CeO_2$—$ZrO_2$ solid solution powder (the $CeO_2$—$ZrO_2$ solid solution contained 40 mass % of $CeO_2$, 50 mass % of $ZrO_2$, and 10 mass % of an oxide of a rare-earth element other than Ce) and alumina powder were provided. The $CeO_2$—$ZrO_2$ solid solution powder and the alumina powder were mixed, and immersed in a rhodium nitrate aqueous solution.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount (g) of solvent absorbed per 1 g of polymer after immersion at 50° C. for 48 hours: 0.02 g/g in ethanol, 0.24 g/g in acetone, 0.05 g/g in 2-methoxyethanol, and 0 g/g in toluene); barium hydroxide; alumina sol; zirconia sol; ceria sol; and water as a liquid solvent were mixed to prepare a slurry. The amount of the $CeO_2$—$ZrO_2$ solid solution powder was 59 parts by mass, the amount of the alumina powder was 22 parts by mass, the amount of barium hydroxide was 9.0 parts by mass, the amount of the alumina sol was 3 parts by mass, the amount of the zirconia sol was 3.0 parts by mass, the amount of the ceria sol was 3.0 parts by mass, and the amount of Rh was 1.0 parts by mass in terms of metal, all based on 100 parts by mass of the components (excluding the void forming reagent) of the solid contents of the slurry. The mass percentage of the void forming reagent was 50% relative to the solid contents of the slurry.

Comparative Example 5

An exhaust gas purification catalyst was obtained as in Comparative Example 4, except that the void forming reagent used in Comparative Example 4 were replaced with the void forming reagent used in Example 4, and that the amount thereof used was changed to 25 mass % relative to the solid contents of the slurry.

Comparative Example 6

An exhaust gas purification catalyst was obtained as in Comparative Example 4, except that the void forming reagent used in Comparative Example 4 for the first slurry was replaced with acicular particles (material: cellulose) having an average diameter of 10 μm, and that the amount thereof used was 25 mass % relative to the solid contents of the slurry.

Comparative Example 7

An exhaust gas purification catalyst was obtained as in Comparative Example 4, except that the void forming reagent used in Comparative Example 4 for the first slurry was replaced with acicular particles (material: cellulose) having an average diameter of 28 μm, and that the amount thereof used was 25 mass % relative to the solid contents of the slurry.

Comparative Example 8

An exhaust gas purification catalyst 10 was obtained as in Example 1, except that preparation of the first slurry in Example 1 was modified as follows.

Modification of Preparation of Slurry:

Zirconia powder and alumina powder were provided. The zirconia powder and the alumina powder were mixed, and immersed in a rhodium nitrate aqueous solution.

Next, with this liquid mixture, a spherical void forming reagent (crosslinked poly(methyl (meth)acrylate) particles; D50: 20 μm; D90: 22 μm; D10: 18 μm; monodispersity: 0.165; thermal decomposition onset temperature: 250° C.; roundness: 95%; amount (g) of solvent absorbed per 1 g of polymer after immersion at 50° C. for 48 hours: 0.02 g/g in ethanol, 0.24 g/g in acetone, 0.05 g/g in 2-methoxyethanol, and 0 g/g in toluene); alumina sol; zirconia sol; and water as a liquid solvent were mixed to prepare a slurry. The amount of the zirconia powder was 85 parts by mass, the amount of the alumina powder was 6.0 parts by mass, the amount of the alumina sol was 3.0 parts by mass, the amount of the zirconia sol was 5.0 parts by mass, and the amount of Rh was 1.0 part by mass in terms of metal, all based on 100 parts by mass of the components (excluding the void forming reagent) of the solid contents of the slurry. The mass percentage of the void forming reagent was 20% relative to the solid contents of the slurry.

Circular Void Percentage, Circle Equivalent Diameter of Approximately-Perfect Circular Void, Number of Approximately-Perfect Circular Voids per 1 $mm^2$, and Ratio of Thickness of Catalyst Portion to Thickness of Partition Wall:

For each of the exhaust gas purification catalysts obtained in Examples 1 to 9 and Comparative Examples 1 to 8, the various parameters shown in Table 1, including the circular void percentage, were determined according to the aforementioned methods in which the width of the division was equal to the median diameter of the circle equivalent diameters of approximately-perfect circular voids in 20 fields-of-view. The sampling method was as described hereinbefore. The observation surfaces in each sample were positioned 10 mm away from the upstream-side end face or downstream-side end face in the exhaust gas flow direction X, and a total of 20 fields-of-view were observed, including 10 fields-of-view on the observation surface 10 mm away from the upstream-side end face and 10 fields-of-view on the observation surface 10 mm away from the downstream-side end face. As illustrated in FIG. 3(c), each sample was a section having a thickness of 10 mm from the observation surface toward the inner side in the direction X. The observation magnification for EPMA mapping was 300×, and the acceleration voltage was either 15 kV (for measuring Al, Ba, Ce, La, Mg, Si, and Zr) or 25 kV (for measuring Pd, Rh, and Pt). In EPMA mapping, the element of the substrate component was regarded as Si, and the catalyst layer components were regarded as Ce and Zr. For SEM for determining the width of the division, the observation magnification was the same as that for EPMA mapping, and the acceleration voltage was 15 kV. PictBear was used as the software for drawing boundary lines. The selective threshold was set to 30 with reference to the color of a clear void section. The results are shown in Table 1. In Examples 1 to 9, the average value of the circular void percentages of 10 fields-of-view for the first catalyst portions was from 12 to 30%, and the average value of the circular void percentages of 10 fields-of-view for the second catalyst portions was from 10 to 30%.

Mass Ratio $CeO_2/ZrO_2$, Mass Ratio $(CeO_2+ZrO_2)/Al_2O_3$, Content of $ZrO_2$ (Mass %), and Mass Ratio $ZrO_2/Al_2O_3$:

From a section different from the section where the sample S was cut out in each of the exhaust gas purification catalysts obtained in Examples 1 to 9 and Comparative Examples 1 to 8, a sample portion was cut out that extended from the downstream-side end face toward the upstream side by a length of 20% based on the catalyst's entire length in the direction X. The composition of the second catalyst portions was determined on the sample according to the aforementioned method. The results are shown in Table 1. Nitric acid and aqua regia were used for dissolving the catalyst.

Also, in each Example, the pore volume resulting from pores having a pore diameter from 5 to 500 nm in the catalyst layers was measured according to the aforementioned method. As a results, the pore volume was within a range from 0.020 to 0.20 $cm^3$/g in all of Examples.

Further, pressure loss, the peeling rate of the catalyst layer, and the PM collection rate were evaluated according to the following methods. The results are shown in Table 1.

Peeling Rate:

A circular-cylindrical sample cut out from the exhaust gas purification catalyst 10 along the exhaust gas flow direction was used as in the determination of the circular void percentage. From the circular-cylindrical sample, the sections extending by a length of 10 mm from both end faces, respectively, in the longitudinal direction (matching the exhaust gas flow direction X) were cut off with a hacksaw, to thereby expose the measurement surfaces on the upstream side and downstream side. Then, a sample having the upstream-side measurement surface (hereinbelow also called "sample T"), which was the section extending by a length of 30 mm from the upstream-side measurement surface, and a sample having the downstream-side measurement surface (hereinbelow also called "sample B"), which was the section extending by a length of 30 mm from the downstream-side measurement surface, were cut out. A peeling test was performed by placing the sample T with the exhaust gas flow direction oriented horizontal, and blowing air toward the upstream-side measurement surface of the sample T from the position 10 cm away from the upstream-side measurement surface with an air gun at 6 atmospheres (gauge pressure) for 10 seconds. The same peeling test was also performed on the downstream-side measurement surface of the sample B. The weight reduction (=(Weight before air blow−Weight after air blow)/Weight before air blow× 100(%)) was calculated for each of the samples T and B, and then the average was calculated. An average of less than 3% was rated A, 3% or greater to less than 6% was rated B, 6% or greater to less than 10% was rated C, and 10% or greater was rated D.

Pressure Loss:

The exhaust gas purification catalyst 10 was fixed by supporting its side surfaces with its upstream end face, in the exhaust gas flow direction, faced upward. Air was sucked downward from below the exhaust gas purification catalyst 10 (i.e., from below the downstream-side end face) at a rate of 50 L/sec. The difference between the air pressure on the upstream-side measurement surface of the sample T and the air pressure on the downstream-side end face of the sample T 10 seconds after starting suction was determined, which was taken as the pressure loss. In the evaluation, the acceptance (passing) level was set to a pressure loss as strict as less than 15 mmHG.

PM Collection Rate:

A gasoline engine vehicle in which the exhaust gas purification catalyst 10 was included was driven in accordance with the driving conditions of the Worldwide-harmonized Light vehicles Test Cycle (WLTC). The number of PM particles in the exhaust gas that passed through the exhaust gas purification catalyst 10, $PN_{cat}$, was counted in each of the following driving phases: low speed phase (from 0 to 589 seconds after the start of driving); medium speed phase (from 589 seconds to 1022 seconds after the start of driving); high speed phase (from 1022 seconds to 1477 seconds after the start of driving); and extra-high speed phase (from 1477 seconds to 1800 seconds after the start of driving). The number of PM particles directly exhausted from the engine, $PN_{all}$, was also counted. The PM collection rate was calculated using the following equation:

PM collection rate (%)=100−($PN_{cat}/PN_{all}$)×100.

Conditions for Determining PM Collection Rate:
Vehicle used for evaluation: 1.5-L direct injection turbo engine.
Gasoline used: Fuel for certification test.
Device for counting PM: From Horiba, Ltd.

forming reagent was used, the voids were acicular, which resulted in a peeling tendency.

REFERENCE SIGNS LIST

10: Exhaust gas purification catalyst;
11: Substrate;
14: First catalyst layer;
15: Second catalyst layer;
21: Inflow-side cell;
22: Outflow-side cell;
23: Partition wall.

TABLE 1

|  | Circular void percentage (%) | $CeO_2$/ $ZrO_2$ mass ratio | ($ZrO_2$ + $CeO_2$)/ $Al_2O_3$ mass ratio | $ZrO_2$ content (mass %) | $ZrO_2$/ $Al_2O_3$ mass ratio | Circle equivalent diameter of approximately-perfect circular (μm) | Number of approximately-perfect circular voids per 1 $mm^2$ | Ratio of thickness of catalyst portion to thickness of partition wall (%) | Pressure loss (mmHg) | Peeling rate | PM collection rate (%) |
|---|---|---|---|---|---|---|---|---|---|---|---|
| Example 1 | 15.3 | 0.20 | 5.24 | 60.4 | 4.35 | 17.7 | 616 | 10.2 | 12.1 | A | 93.1 |
| Example 2 | 22.6 | 0.20 | 5.14 | 61.1 | 4.30 | 18.1 | 874 | 11.0 | 10.5 | A | 91.2 |
| Example 3 | 28.9 | 0.20 | 5.23 | 61.0 | 4.36 | 17.9 | 1112 | 11.9 | 10.1 | B | 90.1 |
| Example 4 | 11.1 | 0.19 | 5.30 | 60.0 | 4.46 | 4.1 | 3871 | 10.1 | 13.1 | A | 92.1 |
| Example 5 | 12.5 | 0.19 | 5.25 | 60.9 | 4.42 | 30.2 | 256 | 9.5 | 12.5 | C | 91.0 |
| Example 6 | 14.4 | 0.00 | 5.55 | 71.4 | 5.55 | 18.5 | 457 | 15.4 | 12.1 | A | 90.1 |
| Example 7 | 15.1 | 0.03 | 5.80 | 65.8 | 5.64 | 18.3 | 516 | 11.5 | 11.1 | A | 89.9 |
| Example 8 | 13.3 | 0.56 | 3.12 | 40.9 | 2.13 | 19.3 | 427 | 12.4 | 9.8 | C | 89.0 |
| Example 9 | 14.2 | 0.00 | 54.5 | 81.8 | 54.5 | 18.3 | 603 | 9.8 | 14.5 | A | 92.5 |
| Comparative Example 1 | 32.9 | 0.19 | 5.19 | 60.3 | 4.38 | 18.0 | 1456 | 12.3 | 9.8 | D | 89.2 |
| Comparative Example 2 | 0.0 | 0.18 | 5.48 | 61.6 | 4.65 | — | 0 | 6.3 | 20.8 | A | 90.1 |
| Comparative Example 3 | 5.1 | 0.20 | 5.11 | 61.2 | 4.27 | 17.2 | 286 | 9.3 | 15.0 | A | 92.9 |
| Comparative Example 4 | 11.8 | 0.82 | 2.50 | 33.3 | 1.37 | 17.5 | 465 | 23.5 | 10.7 | D | 90.1 |
| Comparative Example 5 | 2.4 | 0.80 | 2.43 | 32.9 | 1.35 | 3.5 | 2062 | 13.7 | 17.1 | A | 96.4 |
| Comparative Example 6 | 0.0 | 0.81 | 2.45 | 33.7 | 1.31 | — | 0 | 18.0 | 12.7 | D | 95.9 |
| Comparative Example 7 | 0.0 | 0.81 | 2.42 | 33.9 | 1.33 | — | 0 | 17.4 | 11.8 | D | 92.4 |
| Comparative Example 8 | 15.2 | 0.00 | 10.9 | 90.4 | 10.9 | 18.5 | 583 | 9.1 | 18.2 | A | 93.2 |

As shown in Table 1, small pressure loss, a small peeling rate of the catalyst layer, and a high PM collection rate were obtained in each of exhaust gas purification catalysts of Examples, which had a circular void percentage of greater than 10% to 30% or less and a $ZrO_2$ content of the catalyst portions of from 35 mass % to 85 mass %.

Although the exhaust gas purification catalysts of Comparative Examples 1 to 3 had similar amounts of $ZrO_2$ as those of Examples, the catalyst of Comparative Example 1, which had a circular void percentage more than 30%, had a high peeling rate, and the catalyst of Comparative Example 2 etc., which had a circular void percentage of 10% or less, had high pressure loss. Although the exhaust gas purification catalysts of Comparative Examples 4 and 8 had a circular void percentage within the range of greater than 10% to 30% or less, the catalyst of Comparative Example 4, which had a $ZrO_2$ content in the catalyst portions of less than 35 mass %, had a poor result of peeling rate, and the catalyst of Comparative Example 8, which had a $ZrO_2$ content in the catalyst portions more than 85 mass %, had too much pressure loss. When the circular void percentage was reduced in Comparative Example 4, peeling was suppressed, but pressure loss increased (see Comparative Example 5). In Comparative Examples 6 and 7, in which an acicular void

The invention claimed is:
1. An exhaust gas purification catalyst comprising: a substrate, and catalyst portions provided in the substrate, the catalyst portions including a plurality of voids;
the substrate including:
inflow-side cells, each inflow-side cell being a space having an open end on an inflow side thereof and a closed end on an outflow side thereof in an exhaust gas flow direction;
outflow-side cells, each outflow-side cell being a space having a closed end on an inflow side thereof and an open end on an outflow side thereof in the exhaust gas flow direction; and
porous partition walls, each porous partition wall separating the inflow-side cell and the outflow-side cell from each other;
the catalyst portions being provided on surfaces of the partition walls that each face the inflow-side cell and/or surfaces of the partition walls that each face the outflow-side cell;
wherein
in a cross section vertical to the exhaust gas flow direction, the percentage of a total area of the voids, each void satisfying the expression $L/\{2(\pi S)^{1/2}\} \leq 1.1$, wherein L is a perimeter of the void in the cross section and S is an area of the void in the cross section, is greater than 10% to 30% or less based on an apparent area of the catalyst portion present on the partition wall; and a content of zirconium element in terms of oxide (amount of $ZrO_2$) in the catalyst portions is from 35 mass % to 85 mass %.

2. The exhaust gas purification catalyst according to claim 1, wherein a mass ratio of a content of cerium element in terms of oxide (amount of $CeO_2$) to a content of zirconium element in terms of oxide (amount of $ZrO_2$) in the catalyst portions, $CeO_2/ZrO_2$, is 0.8 or less.

3. The exhaust gas purification catalyst according to claim 1, wherein a mass ratio of the content of zirconium element in terms of oxide (amount of $ZrO_2$ amount) to a content of aluminum element in terms of oxide (amount of $Al_2O_3$) in the catalyst portions, $ZrO_2/Al_2O_3$, is 1.5 or greater.

4. The exhaust gas purification catalyst according to claim 1, wherein a mass ratio of a total of the content of zirconium element in terms of oxide (amount of $ZrO_2$) and the content of cerium element in terms of oxide (amount of $CeO_2$) to the content of aluminum element in terms of oxide (amount of $Al_2O_3$) in the catalyst portions, $(ZrO_2+CeO_2)/Al_2O_3$, is 3.0 or greater.

5. The exhaust gas purification catalyst according to claim 1, wherein an average value of a circle equivalent diameter of the voids that are present on the partition wall and satisfy said expression is from 1 to 60 µm.

6. The exhaust gas purification catalyst according to claim 1, wherein, in the catalyst portions present on the partition wall, an average value of the number of voids satisfying said expression is from 250 to 4000 per 1 $mm^2$ of apparent area in a cross section of the catalyst portion.

7. The exhaust gas purification catalyst according to claim 1, wherein the catalyst portions include:
first catalyst portions each being provided on the surface of the partition wall that faces the inflow-side cell, each first catalyst portion being formed in at least a portion in the area extending from an upstream end by a length of 20 mm downstream therefrom in the exhaust gas flow direction; and/or
second catalyst portions each being provided on the surface of the partition wall that faces the outflow-side cell, each second catalyst portion being formed in at least a portion in the area extending from a downstream end by a length of 20 mm upstream therefrom in the exhaust gas flow direction.

8. The exhaust gas purification catalyst according to claim 7, wherein:
the first catalyst portion's length in the exhaust gas flow direction is from 10 to 80% based on an entire length of the catalyst; and
the second catalyst portion's length in the exhaust gas flow direction is from 30 to 90% based on the entire length of the catalyst.

9. An exhaust gas purification device comprising two or more exhaust gas purification catalysts arranged along an exhaust gas flow direction, wherein:
the exhaust gas purification catalyst according to claim 1 is a second or subsequent catalyst from an upstream side.

* * * * *